United States Patent
Suryanarayanan et al.

(10) Patent No.: US 12,519,311 B2
(45) Date of Patent: Jan. 6, 2026

(54) HYBRIDIZED TRANSMISSION SWITCHING FOR CONTINGENCY MANAGEMENT IN ELECTRIC POWER SYSTEMS

(71) Applicants: COLORADO STATE UNIVERSITY RESEARCH FOUNDATION, Fort Collins, CO (US); BATTELLE ENERGY ALLIANCE, LLC, Idaho Falls, ID (US)

(72) Inventors: Siddharth Suryanarayanan, Brookings, SD (US); Tanveer Hussain, Brookings, SD (US); S M Shafiul Alam, Idaho Falls, ID (US)

(73) Assignees: COLORADO STATE UNIVERSITY RESEARCH FOUNDATION; BATTELLE ENERGY ALLIANCE, LLC

(*) Notice: Subject to any disclaimer, the term of this patent is extended or adjusted under 35 U.S.C. 154(b) by 536 days.

(21) Appl. No.: 18/009,197

(22) PCT Filed: Apr. 9, 2021

(86) PCT No.: PCT/US2021/026540
§ 371 (c)(1),
(2) Date: Dec. 8, 2022

(87) PCT Pub. No.: WO2021/252067
PCT Pub. Date: Dec. 16, 2021

(65) Prior Publication Data
US 2023/0216294 A1 Jul. 6, 2023

Related U.S. Application Data

(60) Provisional application No. 63/037,158, filed on Jun. 10, 2020.

(51) Int. Cl.
*H02J 3/00* (2006.01)
*H02J 3/14* (2006.01)
*H02J 3/38* (2006.01)

(52) U.S. Cl.
CPC ........ *H02J 3/00125* (2020.01); *H02J 3/0012* (2020.01); *H02J 3/14* (2013.01);
(Continued)

(58) Field of Classification Search
CPC ......... H02J 3/0012; H02J 3/00125; H02J 3/14
(Continued)

(56) References Cited

U.S. PATENT DOCUMENTS

| 8,738,191 B2 * | 5/2014 | Aivaliotis | H02J 3/00 700/297 |
| 9,705,329 B2 * | 7/2017 | Khandelwal | H02J 13/00004 |

(Continued)

FOREIGN PATENT DOCUMENTS

| CA | 2743667 A1 * | 5/2010 | ............. G06Q 40/06 |
| CA | 2779307 C  * | 7/2020 | ............. G05B 13/02 |

(Continued)

OTHER PUBLICATIONS

International Search Report and Written Opinion, dated Aug. 5, 2021, received in connection with corresponding International Patent Application No. PCT/US2021/026540.
(Continued)

*Primary Examiner* — Crystal J Barnes-Bullock
(74) *Attorney, Agent, or Firm* — Meunier Carlin & Curfman LLC

(57) ABSTRACT

Disclosed herein are systems and methods to perform hybridized transmission switching of an electric power system to avoid exceeding line ratings and minimize load shedding.

20 Claims, 15 Drawing Sheets

(52) U.S. Cl.
CPC ........... *H02J 3/381* (2013.01); *H02J 2203/10* (2020.01); *H02J 2310/60* (2020.01)

(58) Field of Classification Search
USPC ....................................................... 700/286
See application file for complete search history.

(56) References Cited

U.S. PATENT DOCUMENTS

| | | | |
|---|---|---|---|
| 11,474,279 B2* | 10/2022 | Sun | G06N 5/01 |
| 11,527,889 B2* | 12/2022 | Ghosh | H02J 3/14 |
| 2006/0187600 A1 | 8/2006 | Brown et al. | |
| 2011/0066301 A1 | 3/2011 | Donolo | |
| 2017/0045558 A1 | 2/2017 | Kuroda et al. | |
| 2020/0153250 A1 | 5/2020 | Price | |
| 2021/0028623 A1* | 1/2021 | Rudez | H02H 3/46 |

FOREIGN PATENT DOCUMENTS

| | | | | |
|---|---|---|---|---|
| CA | 3059517 C | * | 2/2021 | ............ H02J 3/1864 |
| CN | 110135489 A | * | 8/2019 | ......... G06F 18/2135 |
| CN | 110797863 A | * | 2/2020 | ................ H02J 3/00 |

OTHER PUBLICATIONS

Li, M., et al., "Corrective Line Switching With Security Constraints for the Base and Contingency Cases," IEEE Transactions on Power Systems, vol. 27, No. 1, 2012, pp. 125-133.

Mogaka, L.O., et al., "Power Prioritization and Load Shedding in an Island with RESs Using ABC Algorithm," Journal of Engineering, vol. 2020, Article ID 8131952, 2020, 10 pages.

A. R. Escobedo, E. Moreno-Centeno, and K. W. Hedman, "Topology control for load shed recovery," IEEE Transactions on Power Systems, vol. 29, No. 2, pp. 908-916, Mar. 2014.

X. Li, P. Balasubramanian, M. Sahraei-Ardakani, M. Abdi-Khorsand, K. W. Hedman, and R. Podmore, "Real-time contingency analysis with corrective transmission switching," IEEE Transactions on Power Systems, vol. 32, No. 4, pp. 2604-2617, Jul. 2017.

S. A. Sadat and M. Sahraei-Ardakani, "Reducing the risk of cascading failures via transmission switching," arXiv preprint arXiv 1810.00651, 2018.

R. D. Zimmerman, C. E. Murillo-Sanchez (2019). Matpower (Version 7.0) [Software]. Available: https://matpower.org.

R. D. Zimmerman, C. E. Murillo-Sanchez, and R. J. Thomas, "Matpower: Steady-State Operations, Planning and Analysis Tools for Power Systems Research and Education," Power Systems, IEEE Transactions on, vol. 26, No. 1, pp. 12-19, Feb. 2011.

CASE39 Power flow data for 39 bus New England system. https://matpower.org/docs/ref/matpower5.0/case39.html Generated on Mon Jan. 26, 2015.

S. A. Blumsack, Network Topologies and Transmission Investment Under Electric-Industry Restructuring, pp. 1-283, May 2006.

M. Soroush and J. D. Fuller, "Accuracies of Optimal Transmission Switching Heuristics Based on DCOPF and ACOPF," in IEEE Transactions on Power Systems, vol. 29, No. 2, pp. 924-932, Mar. 2014.

J. Carpentier, "Contribution á l'étude du dispatching économique," Bulletin de la Société Française des Électriciens, ser. 8, vol. 3, pp. 431-447, 1962.

J. Carpentier, "Optimal power flows," International Journal of Electrical Power and Energy Systems, vol. 1, Issue 1, pp. 3-15, Apr. 1979.

V.M. da Costa, N. Martins, J.L.R. Pereira, "Developments in the Newton Raphson Power Flow Formulation Based on Current Injections," IEEE Transactions on Power Systems, vol. 14, No. 4, pp. 1320-1326, Nov. 1999.

V.M. da Costa and A.L.S. Rosa, "A Comparative Analysis of Different Power Flow Methodologies," IEEE Transmission & Distribution Conference and Exposition: Latin America, Bogota, Aug. 13-15, 2008.

H.W. Dommel, W.F. Tinney, and W.L. Powell, "Further Developments in Newton's method for power system applications," IEEE Winter Power Meeting, Conference Paper No. 70 CP 161-PWR, Jan. 1970, cited in V.M. da Costa, N. Martins, J.L.R. Pereira, "Developments in the Newton Raphson Power Flow Formulation Based on Current Injections," IEEE Transactions on Power Systems, vol. 14, No. 4, p. 1320, Nov. 1999.

U.S. Department of Energy, Energy Information Administration (EIA), International Energy Statistics, 2012, available at http://www.eia.gov/cfapps/ipdbproject/IEDIndex3.cfm?tid=2&pid=2&aid=2.

Wholesale Market Data, 2012, available at http://www.eia.gov/electricity/wholesale/.

FERC Staff, "Principles for Efficient and Reliable Reactive Power Supply and Consumption," available at http://www.https://www.ferc.gov/sites/default/files/2020-04/20050310144430-02-04-05-reactive-power.pdf, Feb. 2005.

FERC Joint Boards on Security Constrained Economic Dispatch, "Study and Recommendations Regarding Security Constrained Economic Dispatch (SCED) in the Northeast by the Joint Board on Economic Dispatch for the Northeast Region," FERC Docket AD05-13, p. 15, available at https://www.ferc.gov/industries/electric/indus-act/joint-boards/northeast-recom.pdf , 2006.

FERC Staff, "Recent ISO Software Enhancements and Future Modeling Plans," available at http://www.ferc.gov/industries/electric/indus-act/rto/rto-iso-soft-2011.pdf, Nov. 2011.

FERC and NERC staff, "Arizona-Southern California Outages on Sep. 8, 2011: Causes and Recommendations," pp. 23-59, Apr. 2012.

FERC Order, Midwest Independent System Operator, 138 FERC ¶ 61,235, FERC Docket ER12-678 (2012).

A. Gómez Expósito, E. Romero Ramos, "Augmented Rectangular Load Flow Model," IEEE Transactions on Power Systems, vol. 17, No. 2, pp. 271-274, May 2002.

H.H. Happ, "Optimal Power Dispatch—A Comprehensive Survey," IEEE Transactions on Power Apparatus and Systems, vol. PAS-96, No. 3, pp. 841-844, May/Jun. 1977.

I.A. Hiskens and R.J. Davy, "Exploring the Power Flow Solution Space Boundary," IEEE Transactions on Power Systems, vol. 16, No. 3, pp. 389-395, Aug. 2001.

M. Huneault and F.D. Galiana, "A Survey of the Optimal Power Flow Literature," IEEE Transactions on Power Systems, vol. 6 No. 2, May 1991, pp. 762-770.

Q.Y. Jiang, H.D. Chiang, C.X. Guo, Y.J. Cao, "Power-current hybrid rectangular formulation for interior-point optimal power flow," Institute of Engineering and Technology (IET) Generation, Transmission and Distribution, vol. 3, Iss. 8, pp. 748-756, 2009.

W.M. Lin, C.H. Huang, T.S. Zhan, "A Hybrid Current-Power Optimal Power Flow Technique," IEEE Transactions on Power Systems, vol. 23, No. 1, pp. 177-185, Feb. 2008.

J.A. Momoh, R.J. Koessler, M.S. Bond, B. Stott, D. Sun, A. Papalexopoulos, P. Ristanovic, "Challenges to Optimal Power Flow," IEEE Transactions on Power Systems, vol. 12, No. 1, pp. 444-447, Feb. 1997.

R.P. O'Neill, "The IV Formulation of the ACOPF and its Linearizations," FERC Technical conference to discuss opportunities for increasing real-time and day-ahead market efficiency through improved software , available at http://www.ferc.gov/EventCalendar/Files/20120626084555-Tuesday_SessionTB_ONeill.ppt.pdf, Jun. 26, 2012.

R. P. O'Neill, T. Dautel and E. Krall, Recent ISO Software Enhancements and Future Software and Modeling Plans, Staff Report, Federal Energy Regulatory Commission, available at http://www.ferc.gov/industries/electric/indus-act/rto/rto-iso-soft-2011.pdf, Nov. 2011, and Private communication with ISO personnel.

J. Peschon, D.S. Piercy, W.F. Tinney, O.J. Tveit, M. Cuénod, "Optimum Control of Reactive Power Flow," IEEE Transactions on Power Apparatus and Systems, vol. PAS-87, No. 1, pp. 40-48, Jan. 1968.

PJM, "PJM's Striving for Perfect Dispatch Nets Nearly $200 Million in Savings," News Release, Jan. 19, 2012, available at https://www.pjm.com/~/media/about-pjm/newsroom/2012-releases/20120119-perfect-dispatch-news-release-2012.ashx.

(56) References Cited

OTHER PUBLICATIONS

J. Riquelme Santos, A. Gómez Expósito, J.L. Martínez Ramos. "Slack Bus Selection to Minimize the System Power Imbalance in Load-Flow Studies." IEEE Transactions on Power Systems, 19(2), May 2004. 987-995.

A.M. Sasson and F.J. Jaimes, "Digital Methods Applied to Power Flow Studies," IEEE Trans. on Power Apparatus and Systems, vol. 86, No. 7, pp. 860-867, Jul. 1967.

A. Schecter, "Exploration of the ACOPF Feasible Region for the Standard IEEE Test Set," FERC Technical conference to discuss opportunities for increasing real-time and day-ahead market efficiency through improved software, available at http://www.ferc.gov/EventCalendar/Files/20120626084625-Tuesday,%20Session%20TC-1,%20Schecter%20.pdf, Jun. 26, 2012.

R.B. Squires, "Economic Dispatch of Generation Directly from Power System Voltages and Admittances," AIEE Trans. vol. 79, pt. III, pp. 1235-1244, 1961.

W.O. Stadlin and D.L. Fletcher, "Voltage Versus Reactive Current Model for Dispatch and Control," IEEE Transactions on Power Apparatus and Systems, vol. PAS-101, No. 10, pp. 3751-3760, Oct. 1982.

B. Stott, "Review of Load-Flow Calculation Methods," Proceedings of the IEEE, vol. 62 No. 7, pp. 916-929, Jul. 1974.

B. Stott, O. Alsac, and A.J. Monticelli, "Security Analysis and Optimization," Proceedings of the IEEE, vol. 75, No. 12, pp. 1623-1644, 1987.

Y. Tao and A.P.S. Meliopoulous , "Optimal Power Flow via Quadratic Power Flow," IEEE Power Systems Conference and Exposition, Phoenix, May 2011.

W.F. Tinney, J.M. Bright, K.D. Demaree, B.A. Hughes, "Some Deficiencies in Optimal Power Flow," IEEE Transactions on Power Systems, vol. 3 No. 2, pp. 676-683, May 1988.

J.B. Ward and H.W. Hale, "Digital Computer Solution of Power Flow Problems," Trans. AIEE (Power Apparatus and Systems), vol. 75, pp. 398-404, Jun. 1956.

\* cited by examiner

HYBRIDIZED TRANSMISSION SWITCHING FOR CONTINGENCY MANAGEMENT IN ELECTRIC POWER SYSTEMS

CROSS REFERENCE TO RELATED APPLICATION

This application is a national stage application filed under 35 U.S.C. § 371 of PCT/US2021/026540 filed Apr. 9, 2021, which claims priority to and benefit of U.S. Provisional Patent Application Ser. No. 63/037,158 filed Jun. 10, 2020, which is fully incorporated by reference and made a part hereof.

GOVERNMENT SUPPORT CLAUSE

This invention was made with government support under DE-AC07-05ID14517 awarded by the Department of Energy. The government has certain rights in the invention.

BACKGROUND

Electric power systems, generally comprised of generators, busses, radial and non-radial transmission lines that serve loads, are subject to reduced resilience, characterized by unavailable supply of electricity, during events triggered by natural causes (e.g., hurricanes, wildfires, winter storms), malicious attackers (e.g., cybersecurity hacks and denial of service such as in the Ukraine in 2015), mechanical failures, and other causes. In the past, such occurrences have been managed by re-dispatching generation sources and/or large amounts of load-shedding. Transmission switching (TS) is a counter-intuitive method to drop or turn off transmission lines from an electrical network (i.e., grid) to reroute the flow of electricity and maintain security of energy supplied to the load centers after one or more contingencies (such as the causes described above). When the grid faces faults, manmade or naturally caused, loads must be decreased (i.e., load shedding) to account for reductions in supply or changes to flow paths. One or more such fault events (also known as contingencies), when occurring with deficient control actions, can lead to widespread load shedding or even blackout scenarios. TS offers a solution to find a reconfigured network topology that can reroute power and keep serving most of, if not all, the loads that might otherwise be shed during contingencies. However, the choice of which transmission line to switch for the highest impact is the result of an exhaustive search which can burden computations as well as be obsolete in its effect due to the time taken to find the solution. The challenge is to find the best TS candidate in suitable time for near optimal recovery.

Complete enumeration (CE)/exhaustive search method (ESM), as shown in FIG. 1, whereby the system effects are studied in simulations by removing one transmission line at a time, can be used to find the best TS candidate(s). The advantage of CE/ESM is that if there exists a best TS candidate, the CE/ESM will find it. Further, the CE/ESM method is compatible with and agnostic to both direct-current optimal power flow (DCOPF) and alternating-current optimal power flow (ACOPF), which are further described in the book: "POWER GENERATION, OPERATION, AND CONTROL" (THIRD EDITION) by Allen J. Wood, Bruce F. Wollenberg, Gerald B. Sheblé, John Wiley & Sons, pp. 1-656, 2013, ISBN 1118733916, 9781118733912, which is fully incorporated by reference. That is why CE/ESM is the best-known algorithm in literature and used as a base case/benchmark to measure the accuracy of other algorithms. But, the CE/ESM algorithm takes too much time to give the final answer when applied to large power systems. Hence, CE/ESM is not computationally viable or scalable. This renders the use of CE/ESM on large-scale real-world power systems limited.

Therefore, there is a need for new algorithms that are as accurate as, but faster than CE/ESM. In particular, there is a need for an algorithm based on the following two attributes: a) moving the vicinity of search to the power system buses that are vulnerable to load shedding and b) using the knowledge of the power system transmission lines operating near the rated limits that has accuracies close to CE/ESM and is faster than CE/ESM.

SUMMARY

Herein we disclose and describe a solution to the above-mentioned intractability of the TS algorithm comprising a search algorithm for rapidly attaining the solution to the choice of TS. The disclosed method is predicated on the connectivity of the network to the load buses (load centers) that will be affected by the incident contingencies. By focusing on the selected branches that will be pushed to operate at or above a certain threshold of tolerance (compared to the emergency ratings of lines) during a contingency, the disclosed algorithm quickly moves through a reduced search space and picks a viable TS candidate. The solution yielded is fast and helps recoup lost load in the grid, thus boosting resilience of the electricity grid.

In one aspect, a computerized method of hybridized transmission switching for contingency management of an electric power system is disclosed. One embodiment of the method comprises determining, by a computer executing an optimal power flow algorithm, dispatchable loads on an electric power system undergoing one or more contingencies and a need for load shedding in order to stabilize the electric power system; identifying, by the computer, one or more load shedding busses (LSBs) in the electric power system for the load shedding; determining, by the computer, one or more transmission lines connected to the LSBs that are operating at or above a threshold percent of an emergency line rating for the transmission lines; determining, by the computer, from a line outage distribution factor (LODF) matrix of the electric power system, a list of N transmission lines of the electric power system that if removed from the electric power system would result in a counter-flow in the determined one or more transmission lines connected to the LSBs that are operating at or above the threshold percent of the emergency line rating for the transmission lines, where N is greater than or equal to 1; determining, by the computer, for each transmission line (n) in the list of N transmission lines of the electric power system that if removed from the electric power system would result in the counter-flow in the determined one or more transmission lines connected to the LSBs that are operating at or above the threshold percent of the emergency line rating for the transmission lines, by the computer executing the optimal power flow algorithm for dispatchable loads on the electric power system with each transmission line (n) of the N list of transmission lines individually and independently removed from the electric power system, a value of load-shedding for stabilizing the electric power system with transmission line (n) removed from the electric power system and repeating this step for all N transmission lines so that each of the N transmission lines is correlated with a load shedding value; and selecting, by the computer, one of the transmission lines (n) from the list of N transmission lines for switching based on the selected transmission line having the minimal load shedding value.

In some instances, the method further comprises the computer opening one or more switches that comprise the electric power system to remove the selected transmission line from the electric power system. Almost always, the computer may send a signal to a control system to remove the selected transmission line from the electric power system. For example, the control system may comprise a supervisory control and data acquisition system (SCADA), an automated transmission system, a smart-grid system, digital relays, circuit breakers, and the like.

In various instances of the method, the optimal power flow algorithm may comprise direct-current optimal power flow (DCOPF) or alternating-current optimal power flow (ACOPF).

In some instances of the method, the threshold percent of the emergency line rating for the transmission lines comprises 99 percent of the emergency line rating for the transmission lines.

In some instances of the method, the method ends if it is determined by the computer that there is no need for load shedding in order to stabilize the electric power system.

In some instances of the method, if it is determined, by the computer, that none of the one or more transmission lines connected to the LSBs are operating at or above the threshold percent of the emergency line rating for the transmission lines; then the method further comprises determining, by the computer, if any one or more of the transmission lines that comprise the electric power system are operating at or above the threshold percent of the emergency line rating for the transmission lines; determining, by the computer, from the line outage distribution factor (LODF) matrix of the electric power system, a list of N transmission lines of the electric power system that if removed from the electric power system would result in a counter-flow in the determined any one or more transmission lines that comprise the electric power system that are operating at or above the threshold percent of the emergency line rating for the transmission lines, where N is greater than or equal to 1; determining, by the computer, for each transmission line (n) in the list of N transmission lines of the electric power system that if removed from the electric power system would result in the counter-flow in the determined any one or more transmission lines that comprise the electric power system that are operating at or above the threshold percent of the emergency line rating for the transmission lines, by the computer executing the optimal power flow algorithm for dispatchable loads on the electric power system with each transmission line (n) of the N list of transmission lines individually and independently removed from the electric power system, a value of load-shedding for stabilizing the electric power system with transmission line (n) removed from the electric power system and repeating this step for all N transmission lines so that each of the N transmission lines is correlated with a load shedding value; and selecting, by the computer, one of the transmission lines (n) from the list of N transmission lines for switching based on the selected transmission line having the minimal load shedding value.

In some instances, the above-described method ends if it is determined by the computer that none of the transmission lines that comprise the electric power system are operating at or above the threshold percent of the emergency line rating for the transmission lines.

In the above-described method, any transmission line that would create an islanding condition for the electric power system is not included in the list of N transmission lines.

Alternatively or optionally, the method may be performed when the electric power system is simultaneously undergoing two contingencies. Typically, a contingency comprises a loss of one or more generators and/or a loss of one or more non-radial transmission lines.

Also disclosed and described herein is a system for hybridized transmission switching for contingency management of an electric power system. One embodiment of the system comprises a processor in communication with a memory, wherein the processor executes computer-executable instructions stored on the memory, said instructions causing the processor to receive an indication that an electric power system is undergoing one or more contingencies, the electric power system comprised of a plurality of generators, busses, radial and non-radial transmission lines; determine by executing an optimal power flow algorithm, dispatchable loads on the electric power system while the electric power system is undergoing the one or more contingencies and a need for load shedding in order to stabilize the electric power system; identify one or more load shedding busses (LSBs) in the electric power system for the load shedding; determine one or more non-radial transmission lines connected to the LSBs that are operating at or above a threshold percent of an emergency line rating for the transmission lines; determine, from a line outage distribution factor (LODF) matrix of the electric power system, a list of N non-radial transmission lines of the electric power system that if removed from the electric power system would result in a counter-flow in the determined one or more non-radial transmission lines connected to the LSBs that are operating at or above the threshold percent of the emergency line rating for the transmission lines, where N is greater than or equal to 1; determine, for each transmission line (n) in the list of N non-radial transmission lines of the electric power system that if removed from the electric power system would result in the counter-flow in the determined one or more non-radial transmission lines connected to the LSBs that are operating at or above the threshold percent of the emergency line rating for the transmission lines, by executing the optimal power flow algorithm for dispatchable loads on the electric power system with each transmission line (n) of the N list of non-radial transmission lines individually and independently removed from the electric power system, a value of load-shedding for stabilizing the electric power system with transmission line (n) removed from the electric power system and repeating this step for all N non-radial transmission lines so that each of the N non-radial transmission lines is correlated with a load shedding value; and selecting one of the transmission lines (n) from the list of N non-radial transmission lines for switching based on the selected transmission line having the minimal load shedding value.

In some aspects, the system further comprises one or more automated switches, wherein the processor opens the one or more automated switches that comprise the electric power system to remove the selected transmission line from the electric power system.

Alternatively or optionally, the electric power system may further comprise a control system, wherein the processor sends a signal to the control system to remove the selected transmission line from the electric power system. The control system may comprise a supervisory control and data acquisition system (SCADA), an automated transmission system, a smart-grid system, digital relays, circuit breakers, and the like.

In various instances of the system, the optimal power flow algorithm comprises direct-current optimal power flow (DCOPF) or alternating-current optimal power flow (ACOPF).

In some instances of the system, the threshold percent of the emergency line rating for the transmission lines comprises 99 percent of the emergency line rating for the transmission lines.

In some instances of the system, the processor takes no further actions if it is determined that there is no need for load shedding in order to stabilize the electric power system.

In some instances of the system, if it is determined, by the processor, that none of the one or more non-radial transmission lines connected to the LSBs are operating at or above the threshold percent of the emergency line rating for the transmission lines; then the processor determines if any one or more of the non-radial transmission lines that comprise the electric power system are operating at or above the threshold percent of the emergency line rating for the transmission lines; determines from the line outage distribution factor (LODF) matrix of the electric power system, a list of N non-radial transmission lines of the electric power system that if removed from the electric power system would result in a counter-flow in the determined any one or more non-radial transmission lines that comprise the electric power system that are operating at or above the threshold percent of the emergency line rating for the transmission lines, where N is greater than or equal to 1; determines for each transmission line (n) in the list of N non-radial transmission lines of the electric power system that if removed from the electric power system would result in the counter-flow in the determined any one or more non-radial transmission lines that comprise the electric power system that are operating at or above the threshold percent of the emergency line rating for the transmission lines, by the processor executing the optimal power flow algorithm for dispatchable loads on the electric power system with each transmission line (n) of the N list of non-radial transmission lines individually and independently removed from the electric power system, a value of load-shedding for stabilizing the electric power system with transmission line (n) removed from the electric power system and repeating this step for all N non-radial transmission lines so that each of the N non-radial transmission lines is correlated with a load shedding value; and selects one of the transmission lines (n) from the list of N non-radial transmission lines for switching based on the selected transmission line having the minimal load shedding value.

In some instances of the system, the processor takes no further action if it is determined that none of the non-radial transmission lines that comprise the electric power system are operating at or above the threshold percent of the emergency line rating for the transmission lines.

In the above-described system, any transmission line that would create an islanding condition is not included in the list of N non-radial transmission lines.

In some instances of the above-described system, the electric power system may be simultaneously undergoing two contingencies, wherein the contingencies may comprise a loss of one or more generators and/or a loss of one or more non-radial transmission lines.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4A illustrates an IEEE 39-bus system without any fault (secure system); FIG. 4B illustrates (N−2) faults occurring at branch 8 and branch 23 (where N, as used here, indicates the number of generators and non-radial lines in the electric power system); FIG. 4C illustrates that the faults are cleared by opening the circuit breakers so that there is a need to perform load shedding of 243.1 MW at bus 3 after (N−2) contingencies; FIG. 4D illustrates that the methods of FIG. 2 or 3 find that branch 4 is the best TS candidate; and FIG. 4E illustrates the final configuration of the IEEE 39-bus system with transmission switching (TS), i.e., removing branch 4 after (N−2) contingencies, and that there is no need to do any load shedding after performing TS.

DETAILED DESCRIPTION

Figure 1:
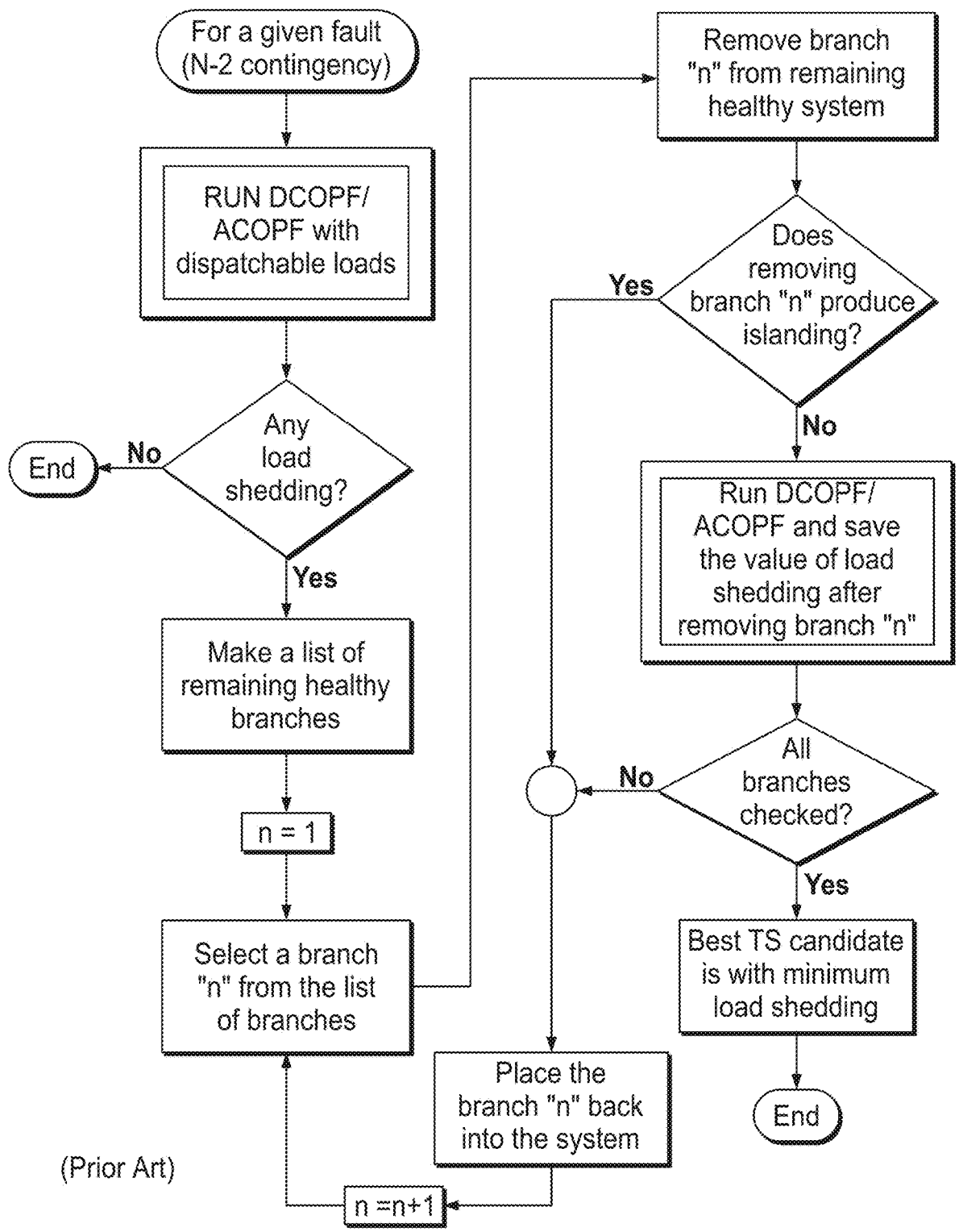
FIG. 1 is a flowchart illustrating the Complete Enumeration (CE)/Exhaustive Search Method (ESM) for transmission switching.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

Figure 2:
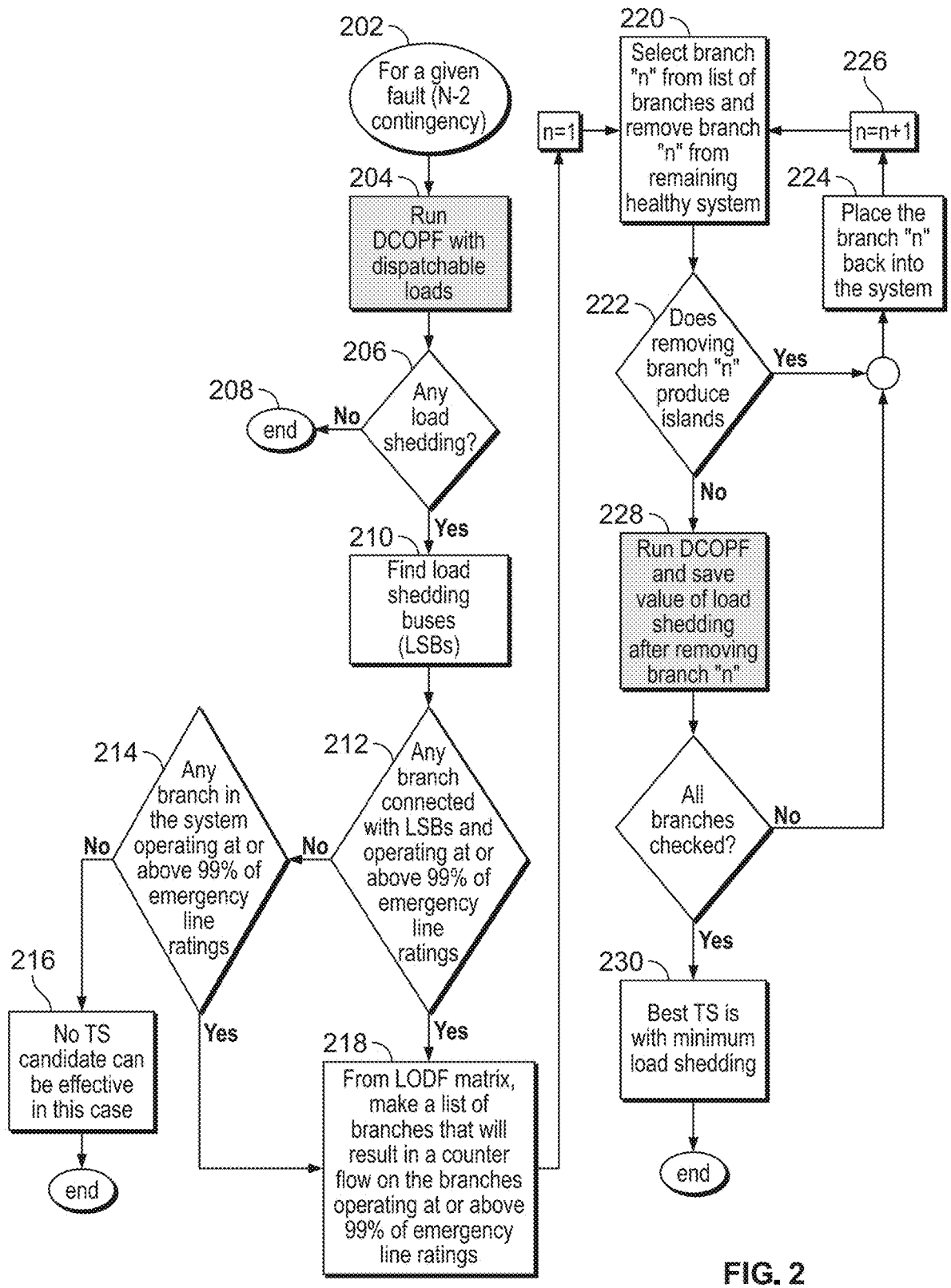
FIG. 2 is flowchart illustrating a DCOPF-based method of hybridized transmission switching for load-shed recovery (LSR) using load-shedding buses (LSBs), and line outage distribution factors (LODFs)
Figure 3:
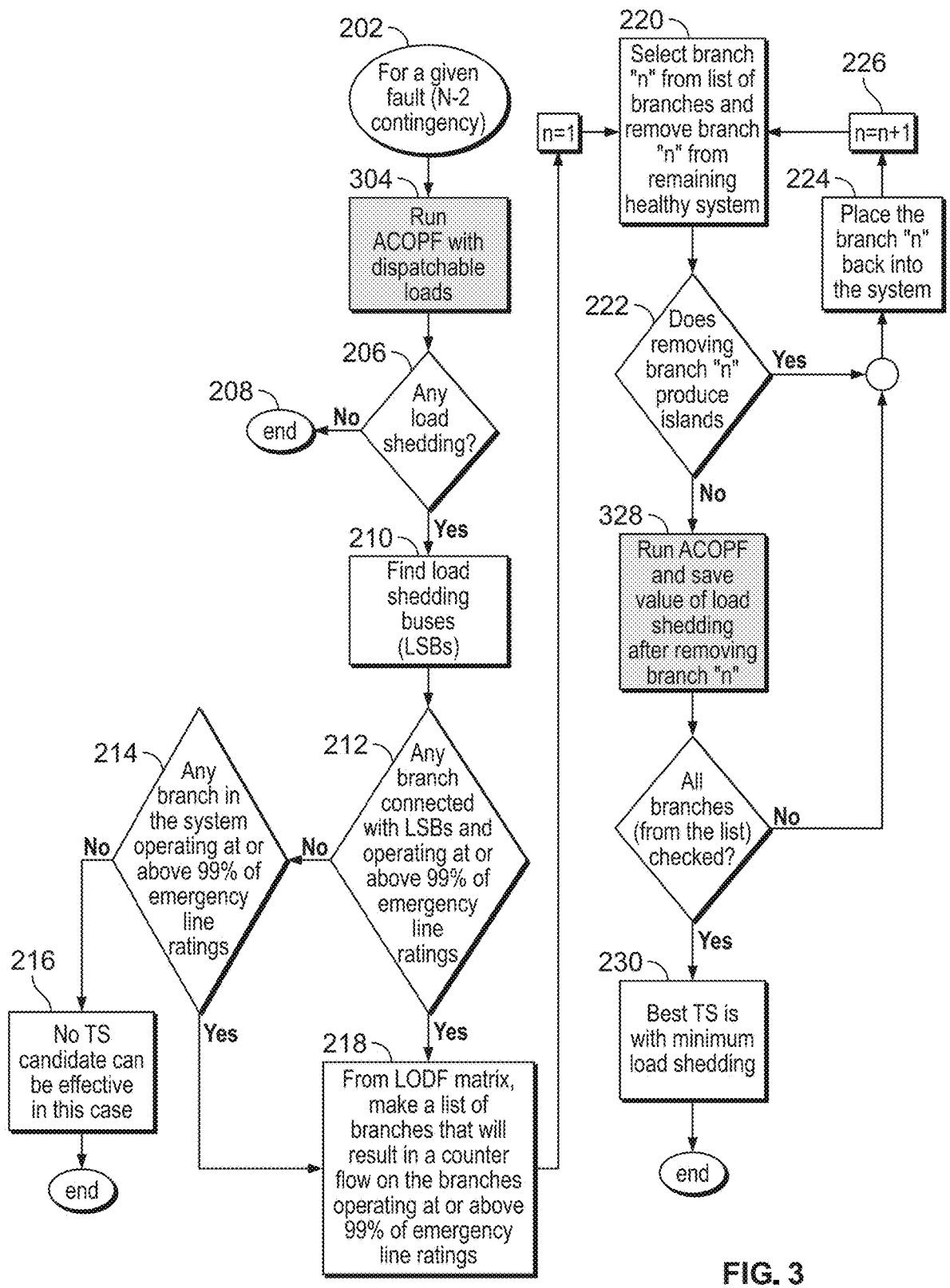
FIG. 3 is a flowchart illustrating an ACOPF-based method of hybridized transmission switching for load-shed recovery (LSR) using LSBs and LODFs.

FIGS. 2 and 3 illustrate flowcharts of exemplary methods of hybridized transmission switching for contingency management in electric power systems. Note that the two flow charts, shown in FIG. 2 and FIG. 3, are identical except that FIG. 2 is based on DCOPF and FIG. 3 is based on ACOPF. FIG. 2 is flowchart illustrating a DCOPF-based method of hybridized transmission switching for load-shed recovery (LSR) using load-shedding buses (LSBs), and line outage distribution factors (LODFs); and FIG. 3 is a flowchart illustrating an ACOPF-based method of hybridized transmission switching for load-shed recovery (LSR) using LSBs and LODFs. The disclosed methods are based on branches operating at or above 99% of emergency line ratings and the concept of vicinities to the load shedding bus (LSB). Using the LODF matrix for these branches operating at or above 99% of emergency line ratings, the proposed algorithm can find the best TS candidate. The LODF matrix comprises a sensitivity measure of how a change in a line's status affects the flows on other lines in the system. On an energized line, the LODF calculation determines the percentage of the present line flow that will show up on other transmission lines after the outage of the line. As an example, the disclosed methods are shown as applied on an IEEE 118-bus test system and the results compared with CE/ESM.

Using FIG. 2 as an example of the disclosed methods, at 202 a contingency occurs on the electric power system (in this example it is N-2 contingencies, though it is to be appreciated that the disclosed methods may be applied when one or more contingencies occur). At 204, DCOPF is run for dispatchable loads on the electric power system. At 206, it is determined if any load shedding is required. If, at 206, no load shedding is required, then the process ends at 208. If, at 206 load shedding is required, then at 210 the busses where load shedding will occur are determined from the results of the DCOPF (e.g., found). At 212, it is determined whether any branch connected to the load shedding buses (LSBs) found in step 210 is operating at or above 99 percent of emergency line ratings. If, at 212 it is determined that no branch connected to the LSBs found in step 210 is operating at or above 99 percent of emergency line ratings, then the process goes to step 214. At 214, it is determined whether any other branch in the electric power system is operating at or above 99 percent of emergency line ratings. If, at 214 it is determined that no branch in the electric power system is operating at or above 99 percent of emergency line ratings, then the process goes to 216, where it ends as no TS candidate can be effective in this instance.

Returning to 214, if it is determined that one or more branches connected to the LSBs found in step 210 in the electric power system are operating at or above 99 percent of emergency line ratings, then at 218, and from a LODF matrix of the electric power system, a list of branches that would result in a counter-flow in the branches determined to be operating at or above 99 percent of emergency line ratings is made. This also occurs when, at 214, it is determined that there are other branches in the electric power system (not just those connected to the LSBs) that are operating at or above 99 percent of emergency line ratings. Once the list of branches (comprised of N branches) that would result in a counter-flow in the branches determined to be operating at or above 99 percent of emergency line ratings is made at 218, the process goes to 220, where, for each branch (n) in the list, that branch is removed from the system and at 222, it is determined whether removing that branch (n) creates an islanding condition in the electric power system (where a generator or a load is completely isolated from the rest of the electric power system). If, at 222 it is determined that removing that branch (n) creates an islanding condition in the electric power system, then at 224 that branch (n) is placed back into the electric power system, a new branch (n+1) is selected from the list at 226, and the process returns to 220, where the new branch (n+1) is removed from the system.

Returning to 222, if it is determined that removing that branch (n) does not create an islanding condition in the electric power system, then the process goes to 228 where DCOPF is run for dispatchable loads on the electric power system with branch (n) removed from the electric power system, and the values of load-shedding determined by DCOPF are saved. These steps (220-228) are repeated for all N branches in the list of branches determined at 218 and all load-shedding values are saved when DCOPF is run with each branch (n) of the N branches run (so long as an islanding condition is not created). In other words, the removal of each branch from the electrical system in the list created at 218 is correlated with a load-shedding value, so long as the removal of that branch does not create an islanding condition in the electric power system. Then, at 230, the branch with the minimal load shedding value is selected for removal (i.e., transmission switch (TS)).

FIG. 3 is a flowchart illustrating an ACOPF-based method of hybridized transmission switching for load-shed recovery (LSR) using LSBs and LODFs. FIG. 3 is identical to FIG. 2 except at steps 204 and 228 (shown as steps 304 and 328 in FIG. 3), ACOPF is run rather than DCOPF. It is to be appreciated that the output from the above-described processes may be used to directly control devices that comprise the electric power system such as switches, breakers, and the like. Alternatively or optionally, such outputs may be provided to a control system such as a supervisory control and data acquisition system (SCADA), an automated transmission system, a smart-grid system, digital relays, circuit breakers, and the like to automatically switch the chosen branch(es) in order to minimize load-shedding and avoid grid failure. In some instances the above-described process may be implemented on computer resources that comprise all or a part of the control system (e.g., the SCADA system, the automated transmission system, the smart-grid system, digital relays, circuit breakers, and the like).

Figure 4A:
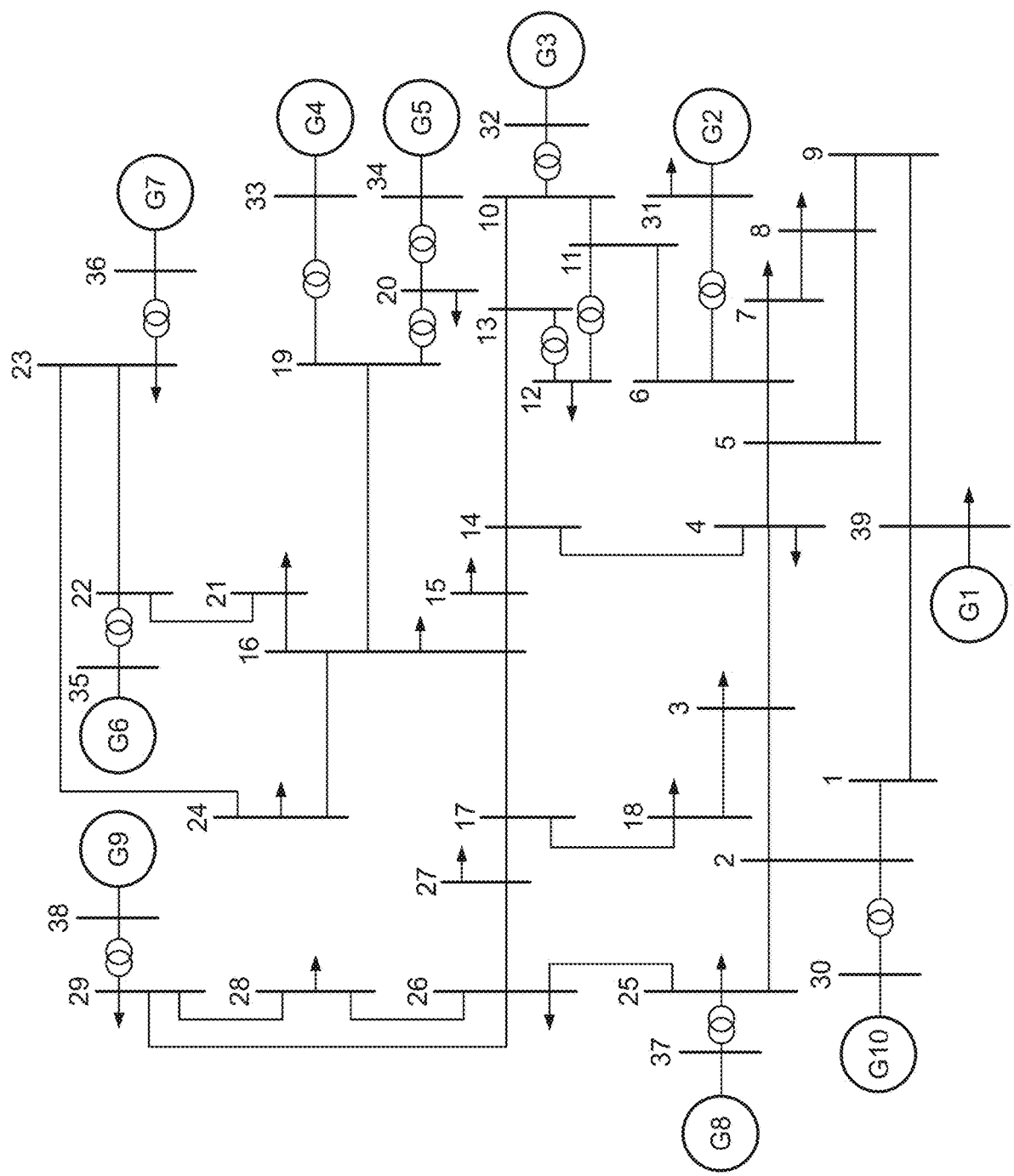
FIGS. 4A-4E illustrate an example of transmission system using the methods described in FIGS. 2 and 3, where
Figure 4B:
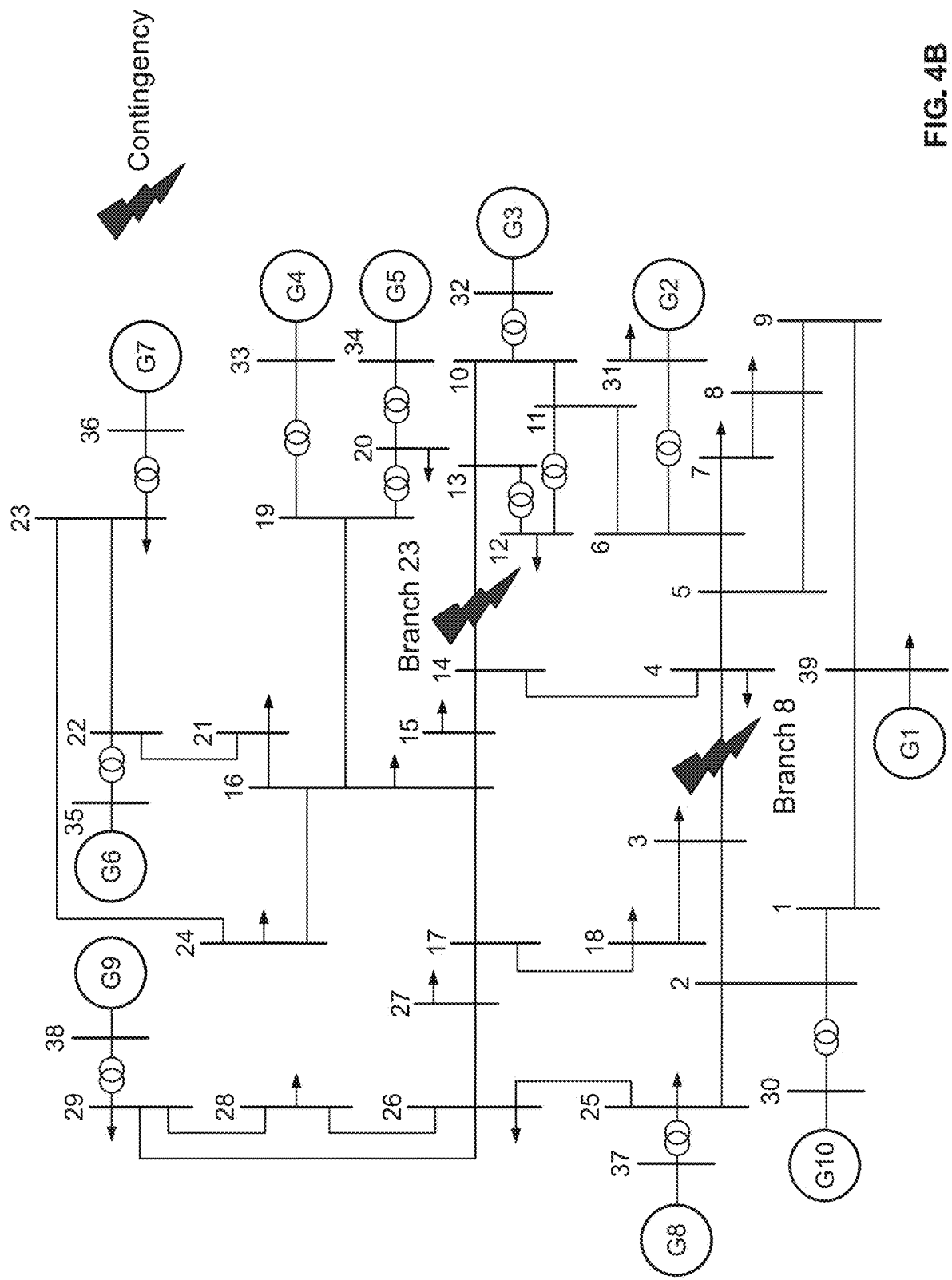
Figure 4C:
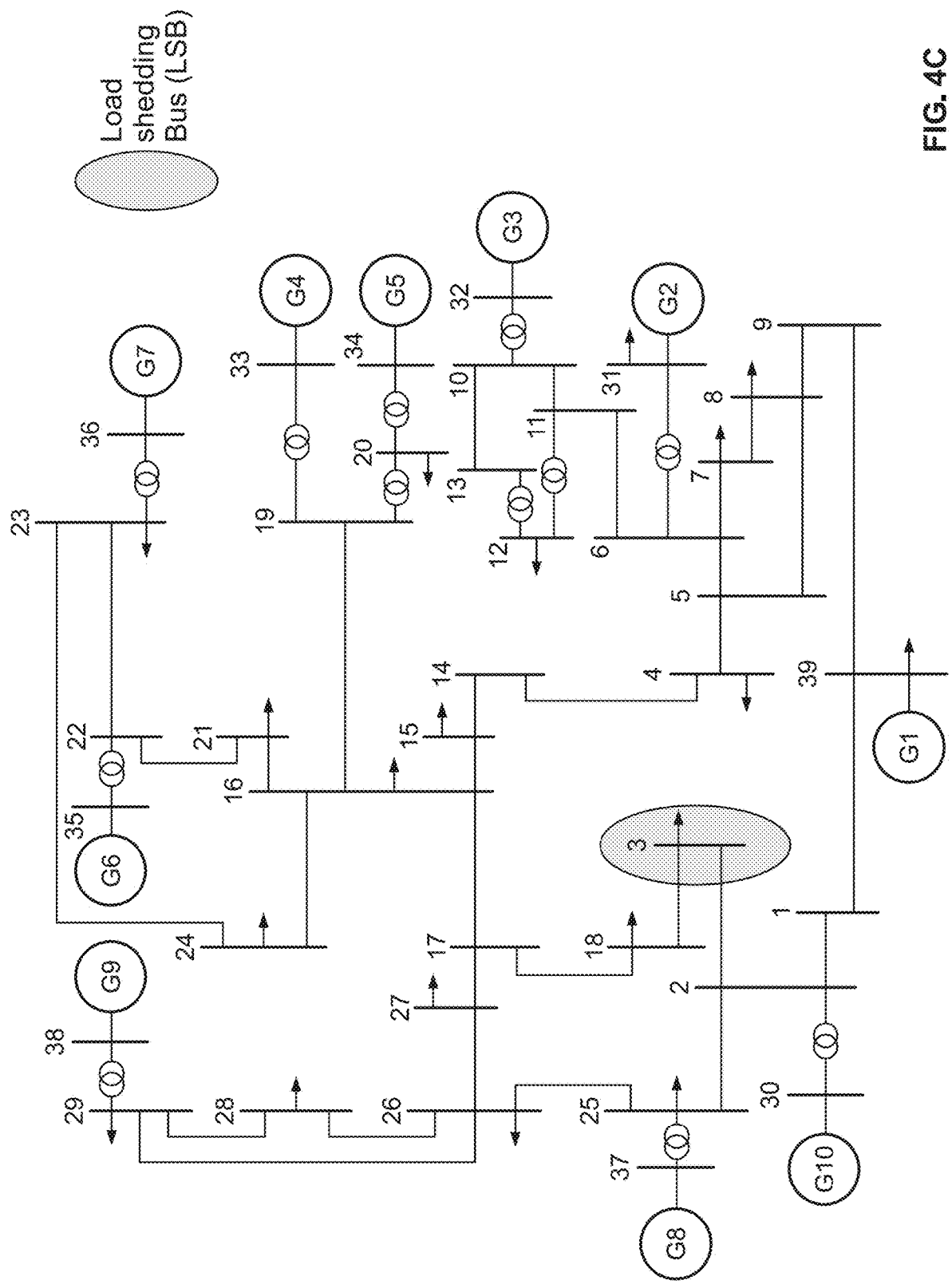
Figure 4D:
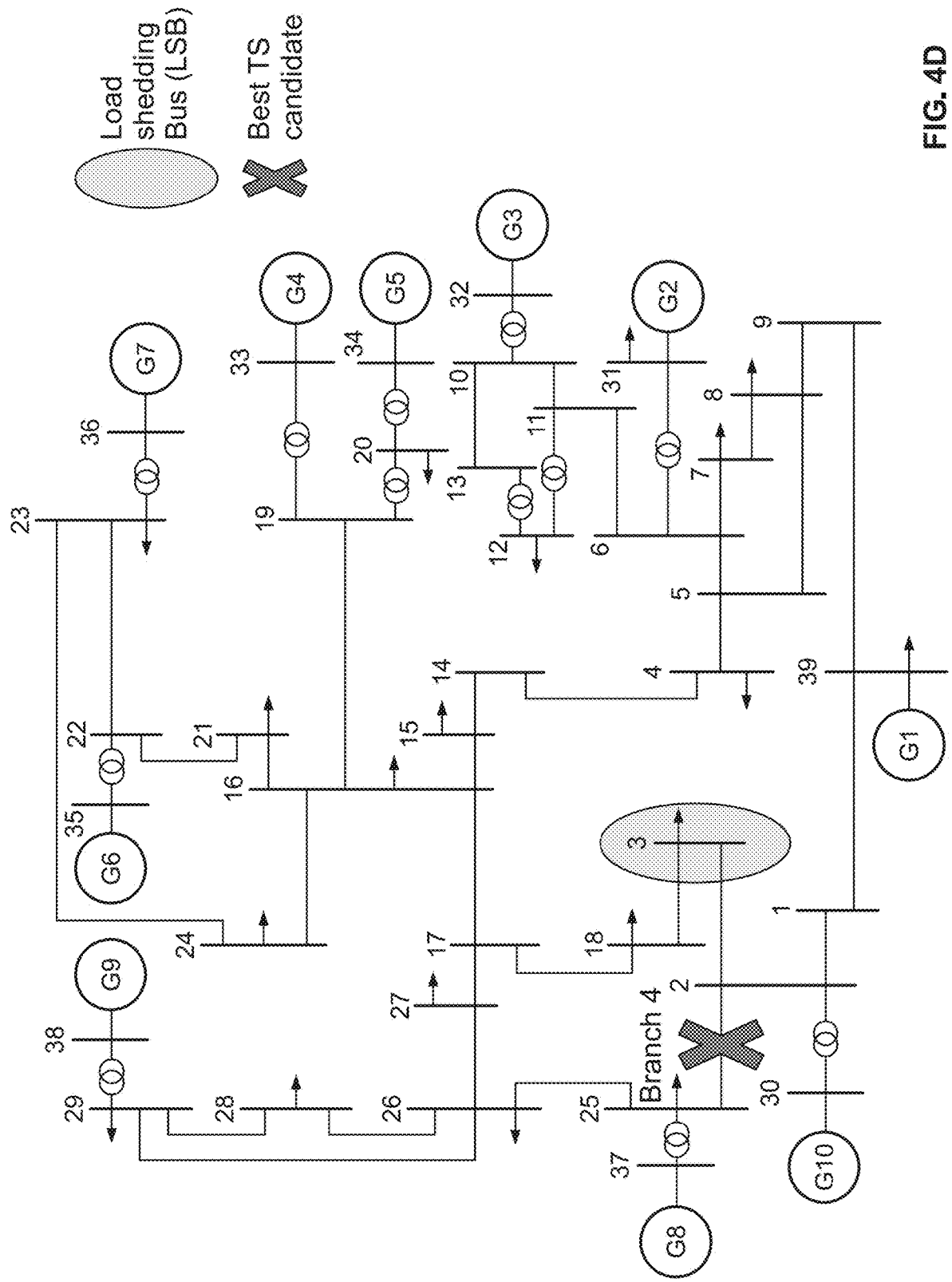
Figure 4E:
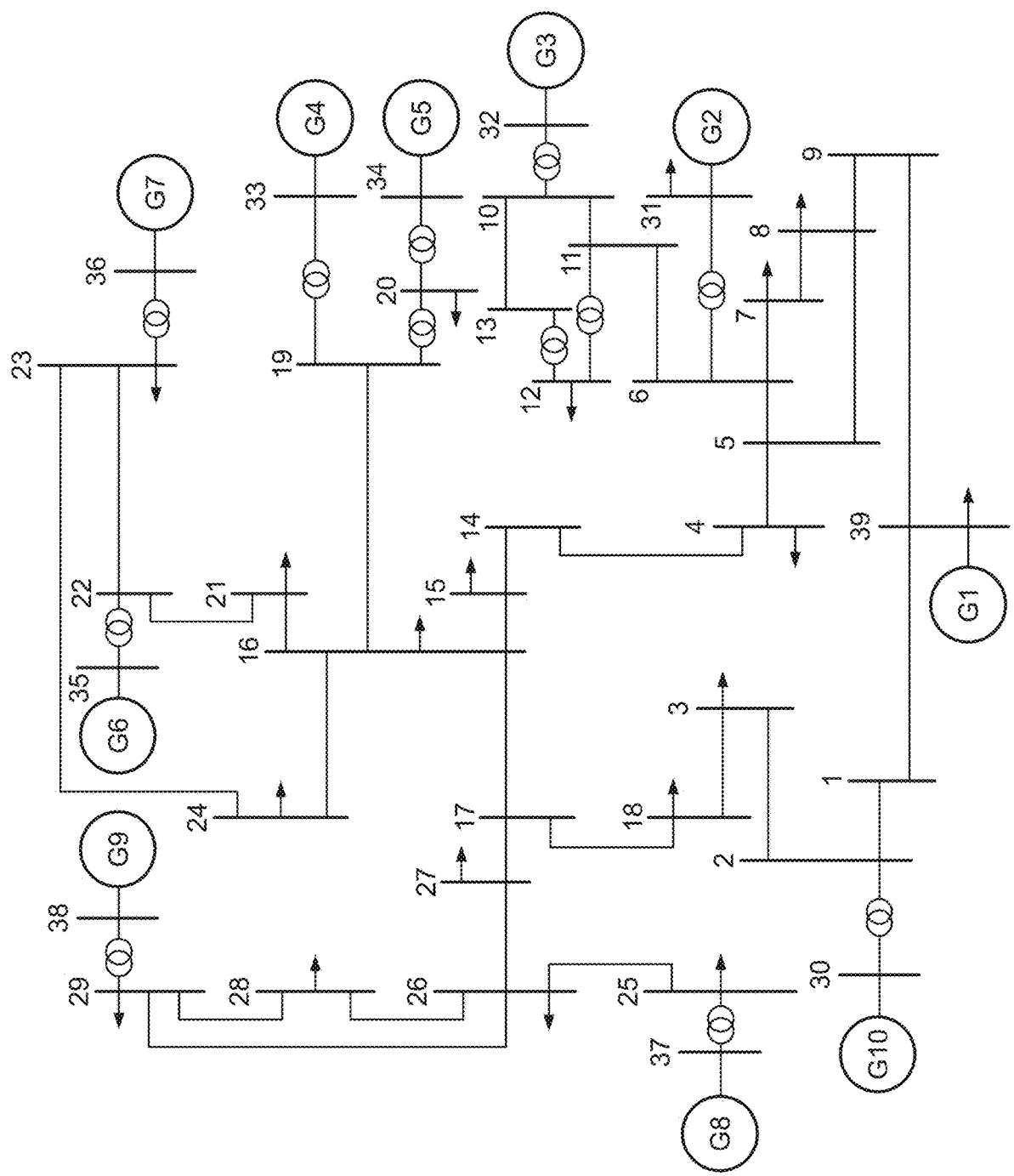

FIGS. 4A-4E illustrate an example of transmission system using the methods described in FIGS. 2 and 3. FIG. 4A shows a secure IEEE 39-bus system with 46 branches. FIG. 4B shows a case where two branches, i.e., branch 23 (between buses 13 and 14) and branch 8 (between buses 3 and 4) have faults (marked with lightning bolts). FIG. 4C shows that the faults are cleared, i.e., branch 23 and branch 8 are out of service and removed from the network. Moreover, there is a need to do load shedding at bus 3 (marked with an oval). After running the DCOPF-based algorithm of the method (see FIG. 2, above), it is determined that the best transmission switching (TS) candidate is branch 4 (between buses 2 and 25) as shown in FIG. 4D with an X. After removing branch 4, there is no need for the proposed load shedding at bus 3, thus boosting resilience of the network. Similar results would have been obtained by running the ACOPF-based algorithm of the method (see FIG. 3, above). FIG. 4E shows the final configuration of the IEEE 39-bus system with TS after (N-2) contingencies.

Figure 5:
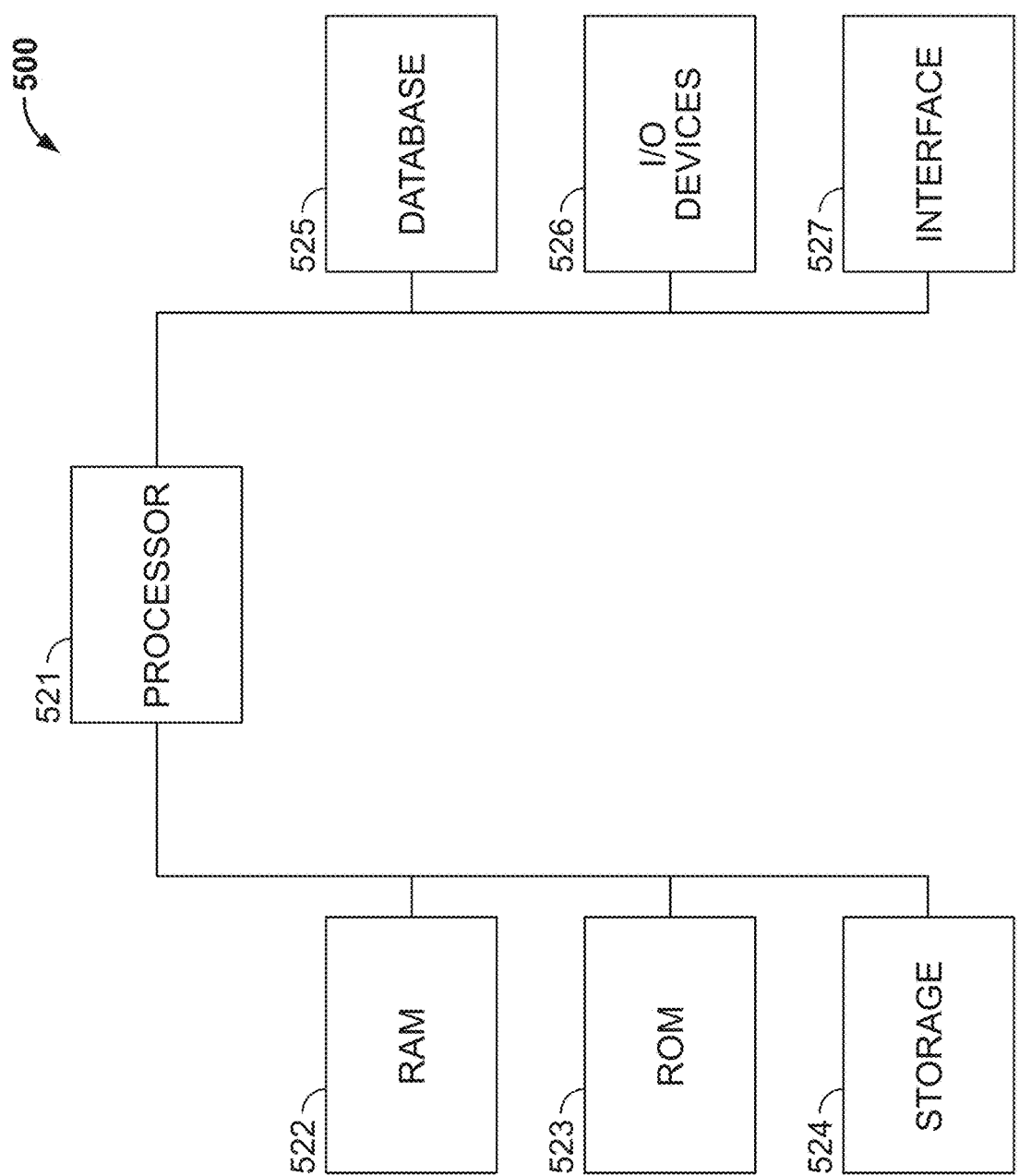
FIG. 5 illustrates an exemplary computer that can be used for hybridized transmission switching for contingency management in electric power systems.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for hybridized transmission switching for contingency management in electric power systems. In one exemplary aspect, the units can comprise a computing device 500 that comprises a processor 521 as illustrated in FIG. 5 and described below. In various embodiments, the computing device 500 may comprise all or a portion of a control system such as a SCADA system, an automated transmission system, a smart-grid system, digital relays, circuit breakers, and the like and is used to before automated transmission switching. In some aspects, the computing device 500 may be in communication with the SCADA system, the automated transmission system, the smart-grid system, digital relays, circuit breakers, and the like and provide instructions for automated transmission switching.

FIG. 5 illustrates an exemplary computer or computing device (used interchangeably herein) that can be used for hybridized transmission switching for contingency management in electric power systems. As used herein, "computer" may include a plurality of computers. The computers may include one or more hardware components such as, for example, a processor 521, a random access memory (RAM) module 522, a read-only memory (ROM) module 523, a storage 524, a database 525, one or more input/output (I/O) devices 526, and an interface 527. Alternatively and/or additionally, the computer may include one or more software components such as, for example, a computer-readable medium including computer executable instructions for performing methods associated with the exemplary embodiments. It is contemplated that one or more of the hardware components listed above may be implemented using software. For example, storage 524 may include a software partition associated with one or more other hardware components. It is understood that the components listed above are exemplary only and not intended to be limiting.

Processor 521 may include one or more processors, each configured to execute instructions and process data to perform one or more functions associated with a computer for hybridized transmission switching for contingency management in electric power systems. Processor 521 may be communicatively coupled to RAM 522, ROM 523, storage 524, database 525, I/O devices 526, and interface 527. Processor 521 may be configured to execute sequences of computer program instructions to perform various processes. The computer program instructions may be loaded into RAM 522 for execution by processor 521.

RAM 522 and ROM 523 may each include one or more devices for storing information associated with operation of processor 521. For example, ROM 523 may include a memory device configured to access and store information associated with the computer, including information for identifying, initializing, and monitoring the operation of one or more components and subsystems. RAM 522 may include a memory device for storing data associated with one or more operations of processor 521. For example, ROM 523 may load computer-executable instructions into RAM 522 for execution by processor 521. Such instructions may include instructions that cause the processor to receive an indication that the electric power system is undergoing one or more contingencies; determine by executing an optimal power flow algorithm, dispatchable loads on the electric power system while the electric power system is undergoing the one or more contingencies and a need for load shedding in order to stabilize the electric power system; identify one or more load shedding busses (LSBs) in the electric power system for the load shedding; determine one or more non-radial transmission lines connected to the LSBs that are operating at or above a threshold percent of an emergency line rating for the transmission lines; determine, from a line outage distribution factor (LODF) matrix of the electric power system, a list of N non-radial transmission lines of the electric power system that if removed from the electric power system would result in a counter-flow in the determined one or more non-radial transmission lines connected to the LSBs that are operating at or above the threshold percent of the emergency line rating for the transmission lines, where N is greater than or equal to 1; determine, for each transmission line (n) in the list of N non-radial transmission lines of the electric power system that if removed from the electric power system would result in the counter-flow in the determined one or more non-radial transmission lines connected to the LSBs that are operating at or above the threshold percent of the emergency line rating for the transmission lines, by executing the optimal power flow algorithm for dispatchable loads on the electric power system with each transmission line (n) of the N list of non-radial transmission lines individually and independently removed from the electric power system, a value of load-shedding for stabilizing the electric power system with transmission line (n) removed from the electric power system and repeating this step for all N non-radial transmission lines so that each of the N non-radial transmission lines is correlated with a load shedding value; and selecting one of the transmission lines (n) from the list of N non-radial transmission lines for switching based on the selected transmission line having the minimal load shedding value.

Storage 524 may include any type of mass storage device configured to store information that processor 521 may need to perform processes consistent with the disclosed embodiments. For example, storage 524 may include one or more magnetic and/or optical disk devices, such as hard drives, CD-ROMs, DVD-ROMs, or any other type of mass media device.

Database 525 may include one or more software and/or hardware components that cooperate to store, organize, sort, filter, and/or arrange data used by the computer and/or processor 521. For example, database 525 may store information about the electric power system being analyzed and tables that correlate transmission switching arrangements with required load-shedding values, among other information. It is contemplated that database 525 may store additional and/or different information than that listed above.

I/O devices 526 may include one or more components configured to communicate information with a user associated with computer. For example, I/O devices may include a console with an integrated keyboard and mouse to allow a user to maintain a database of electric power system information, results of the analysis of the electric power system during contingencies, and the like. I/O devices 526 may also include a display including a graphical user interface (GUI) for outputting information on a monitor. I/O devices 526 may also include peripheral devices such as, for example, a printer for printing information associated with the computer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 527 may include one or more components configured to transmit and receive data via a communication network, such as the Internet, a local area network, a workstation peer-to-peer network, a direct link network, a wireless network, the SCADA system, the automated transmission system, the smart-grid system, digital relays, circuit breakers, and the like or any other suitable communication platform. For example, interface 527 may include one or more modulators, demodulators, multiplexers, demultiplexers, network communication devices, wireless devices, antennas, modems, and any other type of device configured to enable data communication via a communication network.

Simulations

The following examples and simulations are set forth below to illustrate the methods and results according to the disclosed subject matter. These examples and simulations are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process.

In the simulations described below, all the simulations are performed on a 3.89 GHz Windows™ computer with 16 GB RAM without utilizing parallel processing. MATPOWER Interior Point Solver (MIPS) is used for running DCOPF and ACOPF (see, for example, R. D. Zimmerman, C. E. Murillo-Sanchez, and R. J. Thomas, "MATPOWER: Steady-State Operations, Planning and Analysis Tools for Power Systems Research and Education," Power Systems, IEEE Transactions on, vol. 26, no. 1, pp. 12-19, February 2011; which is fully incorporated by reference). All simulations were performed using MATPOWER.

In the simulation setup, data from S. A. Blumsack, Network Topologies and Transmission Investment Under Electric-Industry Restructuring, Thesis, Pittsburgh, Pa., Carnegie Mellon Univ., Carnegie Inst. of Technology, Diss., pp. 1-283, May 2006, incorporated by reference, is used for IEEE 118-bus system. All simulations are performed for N−2 contingencies. The base case (ground truth) is finding the best TS using CE/ESM. Three types of (N−2) contingencies were considered to generate the contingency list (CL) from DCOPF and ACOPF, namely: (1) two generator failures (G1 & G2); (2) two non-radial line failures (L1 & L2) and (3) mixed generator and non-radial line failures (G1 & L1).

Each contingency is classified as trivial or non-trivial; the former and latter are subsets of CL that, after a generation re-dispatch, result in zero or non-zero load shed, respectively. Only non-trivial contingencies are of interest and Table 1 shows the number of non-trivial contingencies in each CL for the IEEE 118-bus test system under study. CL-ALL is sum of contingencies in three contingency types.

TABLE 1

The number of non-trivial contingencies for the IEEE 118-bus test system

|  | CL-ALL | G1 & G2 | L1 & L2 | G1 & L1 |
|---|---|---|---|---|
| DCOPF case | 801 | 39 | 368 | 394 |
| ACOPF case | 3808 | 69 | 2770 | 969 |

As discussed earlier, if there exist a best TS candidate, the CE/ESM (i.e., base case) will find it. Hence, it is assumed that the maximum LSR (i.e., 100%) is achieved by the base case.

Load shed recovery (LSR) in the CE/ESM algorithm is given by:

$$LSR_{CE/ESM} = \sum_{i=1}^{CL} LS_{i(without\ TS)} - \sum_{i=1}^{CL} LS_{i(CE/ESM)}$$

where LS is load shedding in MW.

LSR in the provided algorithm (PA) of the disclosed methods is given by:

$$LSR_{PA} = \sum_{i=1}^{CL} LS_{i(without\ TS)} - \sum_{i=1}^{CL} LS_{i(PA)}$$

Note that, $\sum_{i=1}^{CL} LS_{i(CE/ESM)} \leq \sum_{i=1}^{CL} LS_{i(PA)}$. Hence, $LSR_{CE/ESM} \geq LSR_{PA}$.

Percentage load shed recovery (% LSR) is given by:

$$\%\ LSR = \left[\frac{LSR_{PA}}{LSR_{CE/ESM}}\right] * 100$$

And, speed up in worst $$case = \frac{\text{Maximum time taken by provided algorithm}}{\text{Maximum time taken by base case}}$$

Figure 6:
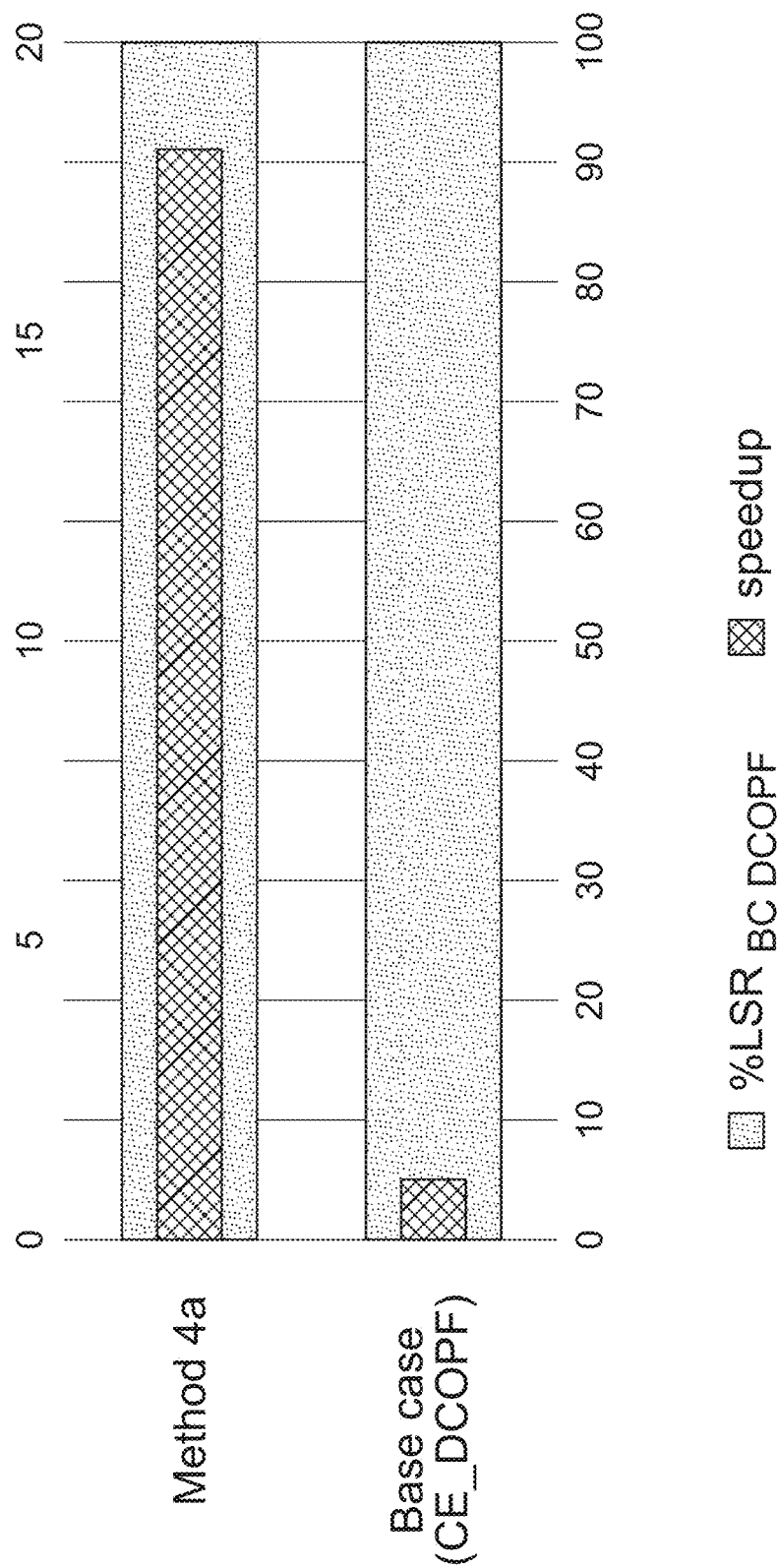
FIG. 6 illustrates simulation results for IEEE 118-bus system (N−2 G1 and G2 contingencies using DCOPF) (note that "BC," as used in FIGS. 6-11 stands for "base case")
Figure 7:
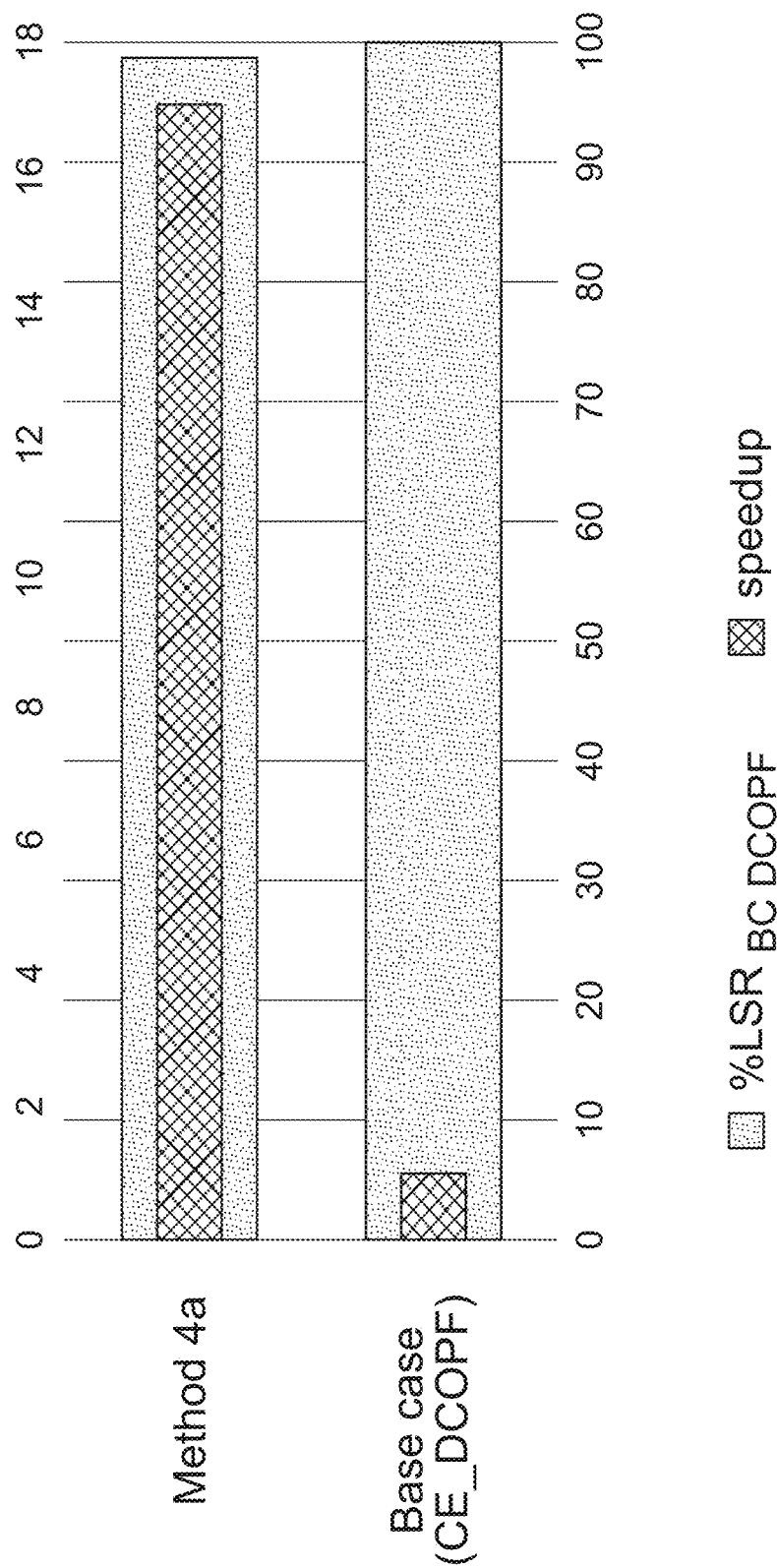
FIG. 7 illustrates simulation results for IEEE 118-bus system (N−2 G1 and L1 contingencies using DCOPF)
Figure 8:
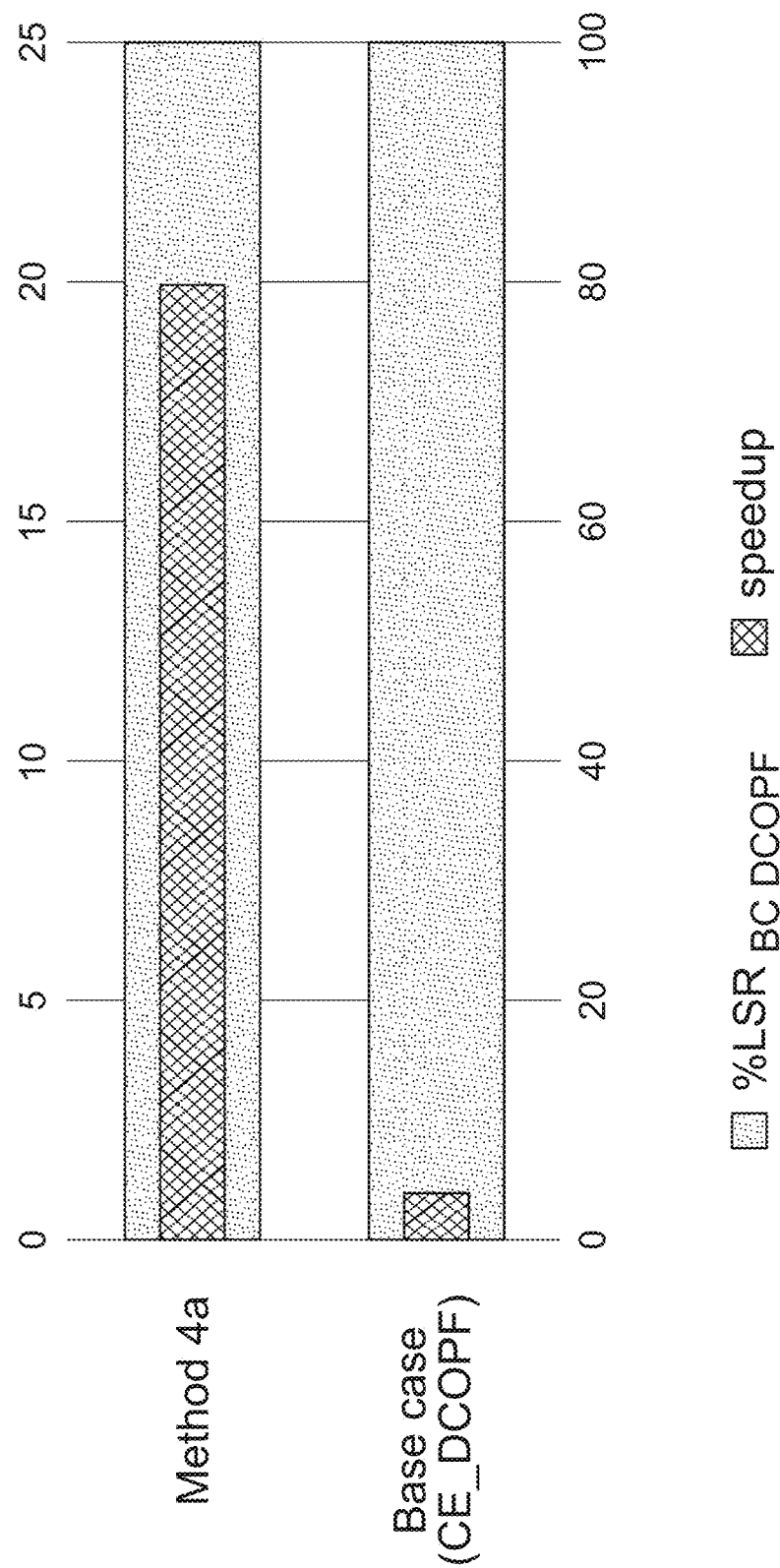
FIG. 8 illustrates simulation results for IEEE 118-bus system (N−2 L1 and L2 contingencies using DCOPF)

FIGS. 6, 7, and 8 show the comparison of the provided algorithm shown in FIG. 2. i.e. based on DCOPF with CE/ESM (base case). In the figures, "method 4a" is the provided algorithm.

Figure 9:
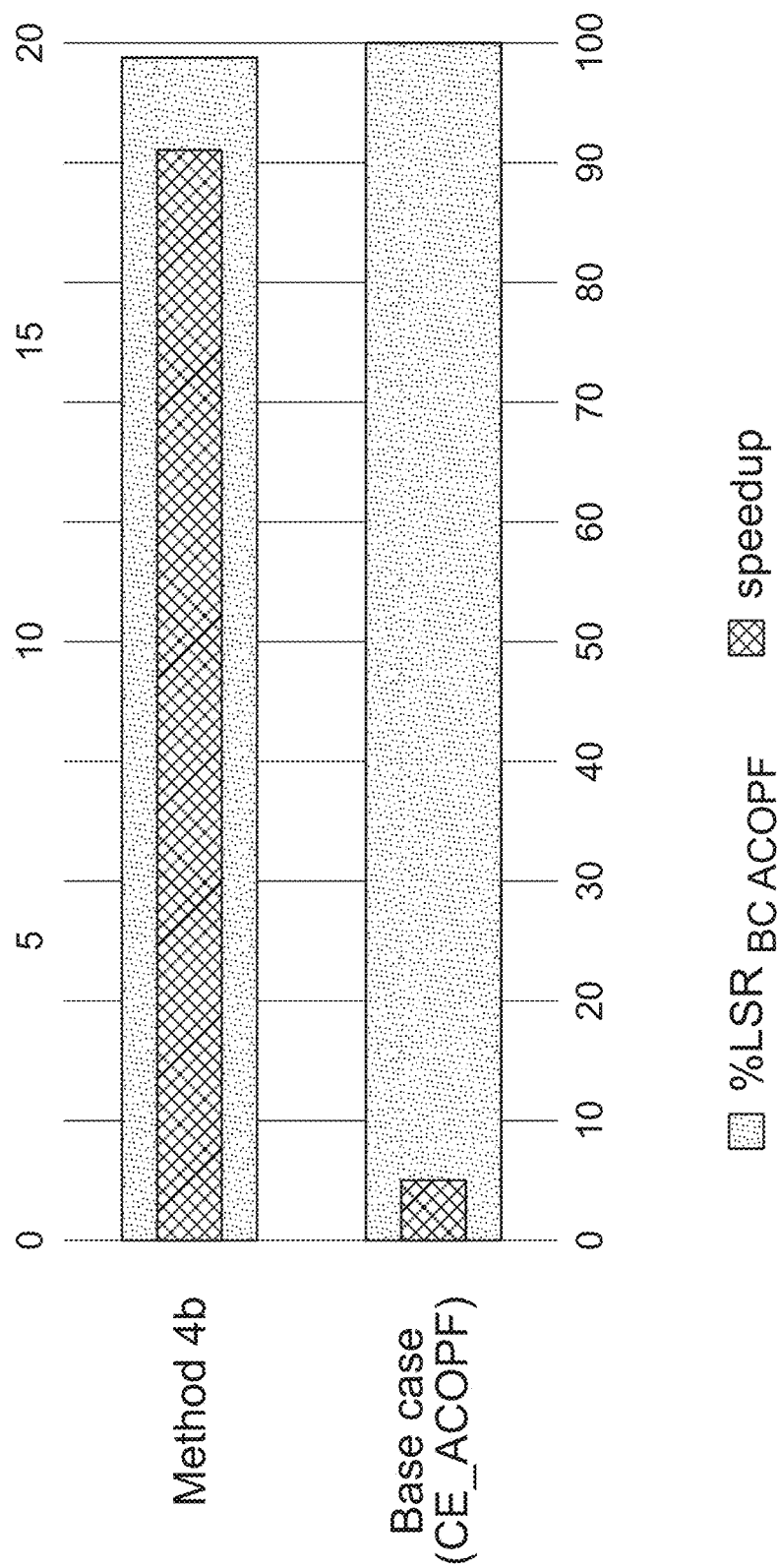
FIG. 9 illustrates simulation results for IEEE 118-bus system (N−2 G1 and G2 contingencies using ACOPF)
Figure 10:
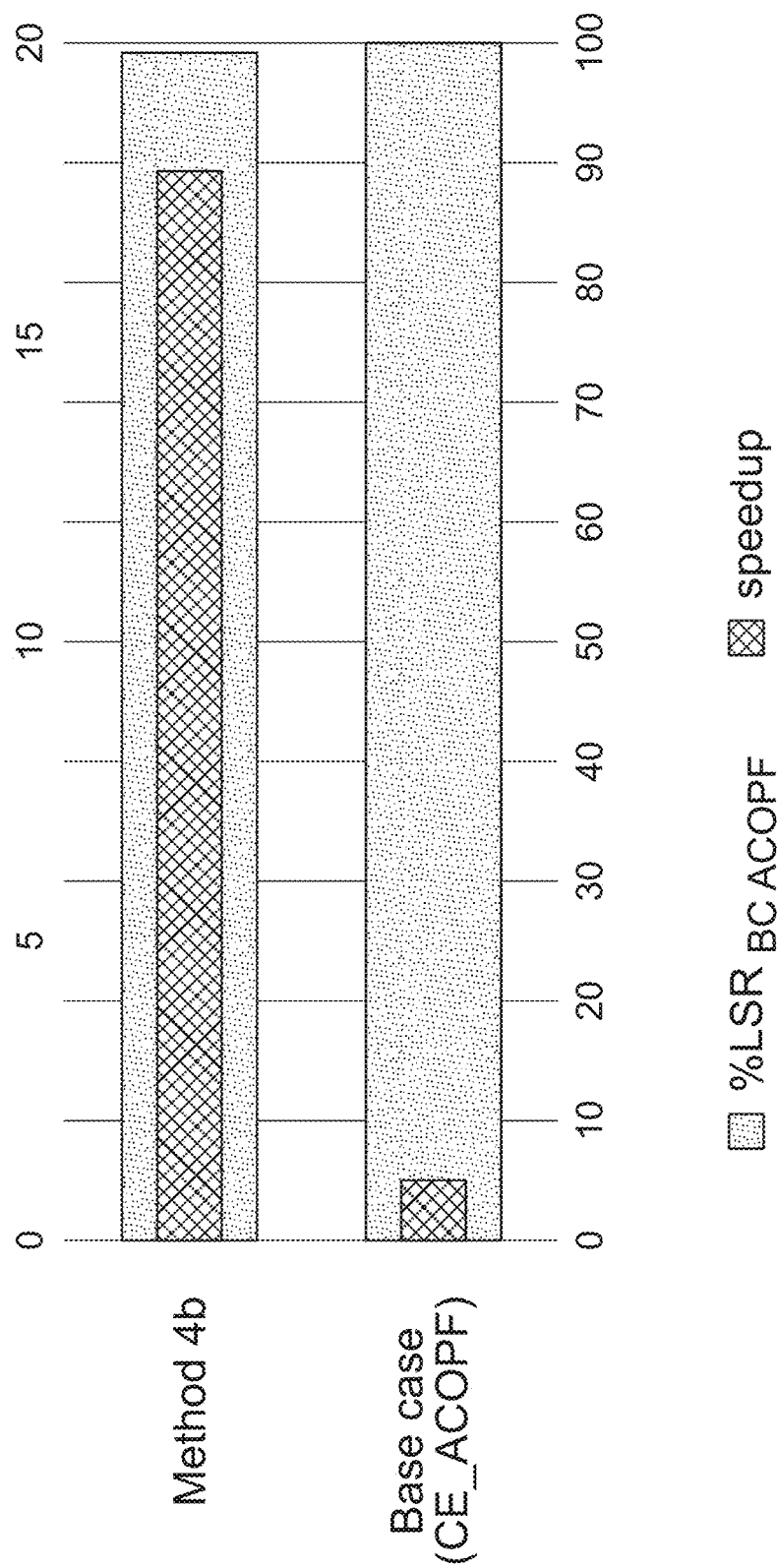
FIG. 10 illustrates simulation results for IEEE 118-bus system (N−2 G1 and L1 contingencies using ACOPF)
Figure 11:
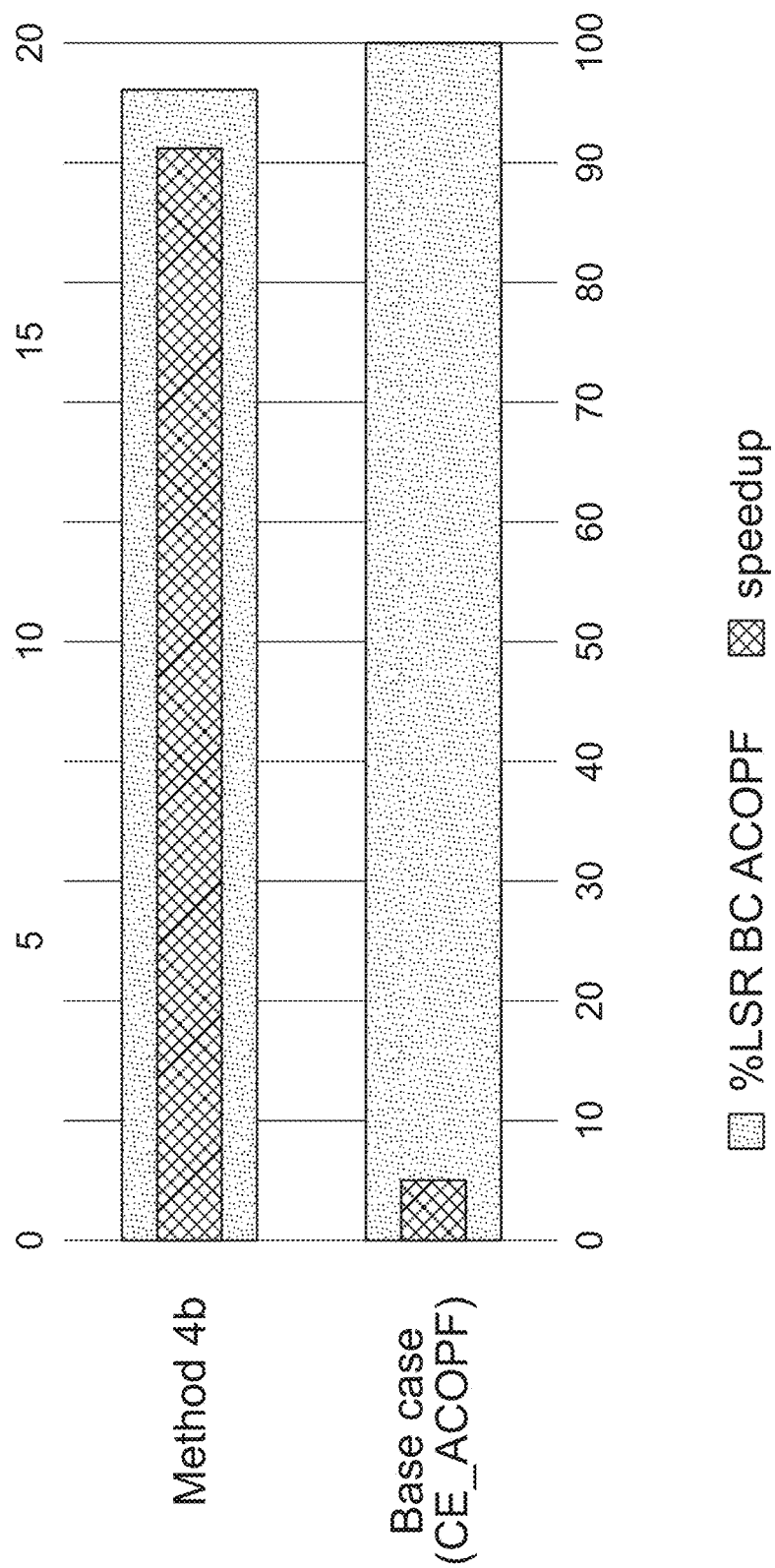
FIG. 11 illustrates simulation results for IEEE 118-bus system (N−2 L1 and L2 contingencies using ACOPF)

FIGS. 9, 10, and 11 show the comparison of the provided algorithm shown in FIG. 3. i.e. based on ACOPF with CE/ESM (base case). Note that the base case shown in FIGS. 6, 7, and 8 is based on DCOPF whereas the base case shown in FIGS. 9, 10, and 11 is based on ACOPF. In the figures, "method 4a" is the provided algorithm.

As can be seen in FIGS. 6-11, speed-ups in the DCOPF and ACOPF cases, on average, are approximately 18 times that of the CE/ESM (base case). The accuracy in the DCOPF and ACOPF cases are, on average, approximately 99.17% and 97.3%, respectively, of the values yielded by the CE/ESM (base case).

Conclusion

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby fully incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computerized method of hybridized transmission switching for contingency management of an electric power system, comprising:

determining, by a computer executing an optimal power flow algorithm, dispatchable loads on an electric power system undergoing one or more contingencies and a need for load shedding in order to stabilize the electric power system;

identifying, by the computer, one or more load shedding busses (LSBs) in the electric power system for the load shedding;

determining, by the computer, one or more transmission lines connected to the LSBs that are operating at or above a threshold percent of an emergency line rating for the transmission lines;

determining, by the computer, from a line outage distribution factor (LODF) matrix of the electric power system, a list of N transmission lines of the electric power system that if removed from the electric power system would result in a counter-flow in the determined one or more transmission lines connected to the LSBs that are operating at or above the threshold percent of the emergency line rating for the transmission lines, where N is greater than or equal to 1;

determining, by the computer, for each transmission line (n) in the list of N transmission lines of the electric power system that if removed from the electric power system would result in the counter-flow in the determined one or more transmission lines connected to the LSBs that are operating at or above the threshold percent of the emergency line rating for the transmission lines, by the computer executing the optimal power flow algorithm for dispatchable loads on the electric power system with each transmission line (n) of the N list of transmission lines individually and independently removed from the electric power system, a value of load-shedding for stabilizing the electric power system with transmission line (n) removed from the electric power system and repeating this step for all N transmission lines so that each of the N transmission lines is correlated with a load shedding value; and selecting, by the computer, one of the transmission lines (n) from the list of N transmission lines for switching based on the selected transmission line having the minimal load shedding value.

2. The method of claim 1, further comprising the computer sending a signal to a control system to remove the selected transmission line from the electric power system.

3. The method of claim 2, wherein the control system comprises a supervisory control and data acquisition system (SCADA), an automated transmission system,—a smart-grid system digital relays, or circuit breakers.

4. The method of claim 1, wherein the optimal power flow algorithm comprises direct-current optimal power flow (DCOPF) or alternating-current optimal power flow (ACOPF).

5. The method of claim 1, wherein the threshold percent of the emergency line rating for the transmission lines comprises 99 percent of the emergency line rating for the transmission lines.

6. The method of claim 1, wherein the method ends if it is determined by the computer that there is no need for load shedding in order to stabilize the electric power system.

7. The method of claim 1, wherein if it is determined, by the computer, that none of the one or more transmission lines connected to the LSBs are operating at or above the threshold percent of the emergency line rating for the transmission lines; then:

determining, by the computer, if any one or more of the transmission lines that comprise the electric power system are operating at or above the threshold percent of the emergency line rating for the transmission lines;

determining, by the computer, from the line outage distribution factor (LODF) matrix of the electric power system, a list of N transmission lines of the electric power system that if removed from the electric power system would result in a counter-flow in the determined any one or more transmission lines that comprise the electric power system that are operating at or above the threshold percent of the emergency line rating for the transmission lines, where N is greater than or equal to 1;

determining, by the computer, for each transmission line (n) in the list of N transmission lines of the electric power system that if removed from the electric power system would result in the counter-flow in the determined any one or more transmission lines that comprise the electric power system that are operating at or above the threshold percent of the emergency line rating for the transmission lines, by the computer executing the optimal power flow algorithm for dispatchable loads on the electric power system with each transmission line (n) of the N list of transmission lines individually and independently removed from the electric power system, a value of load-shedding for stabilizing the electric power system with transmission line (n) removed from the electric power system and repeating this step for all N transmission lines so that each of the N transmission lines is correlated with a load shedding value; and selecting, by the computer, one of the transmission lines (n) from the list of N transmission lines for switching based on the selected transmission line having the minimal load shedding value.

8. The method of claim 1, wherein the method ends if it is determined by the computer that none of the transmission lines that comprise the electric power system are operating at or above the threshold percent of the emergency line rating for the transmission lines.

9. The method of claim 1, wherein any transmission line that would create an islanding condition is not included in the list of N transmission lines.

10. The method of claim 1, wherein the one or more contingencies comprises a loss of one or more generators and/or a loss of one or more non-radial transmission lines.

11. A system for hybridized transmission switching for contingency management of an electric power system, comprising:

an electric power system comprised of a plurality of generators, busses, radial and non-radial transmission lines;

a processor in communication with a memory, wherein the processor executes computer-executable instructions stored on the memory, said instructions causing the processor to:

receive an indication that the electric power system is undergoing one or more contingencies;

determine by executing an optimal power flow algorithm, dispatchable loads on the electric power system while the electric power system is undergoing the one or more contingencies and a need for load shedding in order to stabilize the electric power system;

identify one or more load shedding busses (LSBs) in the electric power system for the load shedding;

determine one or more non-radial transmission lines connected to the LSBs that are operating at or above a threshold percent of an emergency line rating for the transmission lines;

determine, from a line outage distribution factor (LODF) matrix of the electric power system, a list of N non-radial transmission lines of the electric power system that if removed from the electric power system would result in a counter-flow in the determined one or more non-radial transmission lines connected to the LSBs that are operating at or above the threshold percent of the emergency line rating for the transmission lines, where N is greater than or equal to 1;

determine, for each transmission line (n) in the list of N non-radial transmission lines of the electric power system that if removed from the electric power system would result in the counter-flow in the determined one or more non-radial transmission lines connected to the LSBs that are operating at or above the threshold percent of the emergency line rating for the transmission lines, by executing the optimal power flow algorithm for dispatchable loads on the electric power system with each transmission line (n)

of the N list of non-radial transmission lines individually and independently removed from the electric power system, a value of load-shedding for stabilizing the electric power system with transmission line (n) removed from the electric power system and repeating this step for all N non-radial transmission lines so that each of the N non-radial transmission lines is correlated with a load shedding value; and selecting one of the transmission lines (n) from the list of N non-radial transmission lines for switching based on the selected transmission line having the minimal load shedding value.

12. The system of claim 11, wherein the electric power system further comprises a control system, wherein the processor sends a signal to the control system to remove the selected transmission line from the electric power system.

13. The system of claim 12, wherein the control system comprises a supervisory control and data acquisition system (SCADA), an automated transmission system, a smart-grid system, digital relays, or circuit breakers.

14. The system of claim 11, wherein the optimal power flow algorithm comprises direct-current optimal power flow (DCOPF) or alternating-current optimal power flow (ACOPF).

15. The system of claim 11, wherein the threshold percent of the emergency line rating for the transmission lines comprises 99 percent of the emergency line rating for the transmission lines.

16. The system of claim 11, wherein the processor takes no further actions if it is determined that there is no need for load shedding in order to stabilize the electric power system.

17. The system of claim 11, wherein if it is determined, by the processor, that none of the one or more non-radial transmission lines connected to the LSBs are operating at or above the threshold percent of the emergency line rating for the transmission lines; then:

determining, by the processor, if any one or more of the non-radial transmission lines that comprise the electric power system are operating at or above the threshold percent of the emergency line rating for the transmission lines;

determining, by the processor, from the line outage distribution factor (LODF) matrix of the electric power system, a list of N non-radial transmission lines of the electric power system that if removed from the electric power system would result in a counter-flow in the determined any one or more non-radial transmission lines that comprise the electric power system that are operating at or above the threshold percent of the emergency line rating for the transmission lines, where N is greater than or equal to 1;

determining, by the processor, for each transmission line (n) in the list of N non-radial transmission lines of the electric power system that if removed from the electric power system would result in the counter-flow in the determined any one or more non-radial transmission lines that comprise the electric power system that are operating at or above the threshold percent of the emergency line rating for the transmission lines, by the processor executing the optimal power flow algorithm for dispatchable loads on the electric power system with each transmission line (n) of the N list of non-radial transmission lines individually and independently removed from the electric power system, a value of load-shedding for stabilizing the electric power system with transmission line (n) removed from the electric power system and repeating this step for all N non-radial transmission lines so that each of the N non-radial transmission lines is correlated with a load shedding value; and selecting, by the processor, one of the transmission lines (n) from the list of N non-radial transmission lines for switching based on the selected transmission line having the minimal load shedding value.

18. The system of claim 11, wherein the processor takes no further action if it is determined that none of the non-radial transmission lines that comprise the electric power system are operating at or above the threshold percent of the emergency line rating for the transmission lines.

19. The system of claim 11, wherein any transmission line that would create an islanding condition is not included in the list of N non-radial transmission lines.

20. The system of claim 11, wherein the one or more contingencies comprises a loss of one or more generators and/or a loss of one or more non-radial transmission lines.

* * * * *